US012022253B2

United States Patent
(12) United States Patent
Lo et al.

(10) Patent No.: US 12,022,253 B2
(45) Date of Patent: Jun. 25, 2024

(54) VENTING DEVICE

(71) Applicant: xMEMS Labs, Inc., Santa Clara, CA (US)

(72) Inventors: Chiung C. Lo, San Jose, CA (US); Martin George Lim, Hillsborough, CA (US); Jemm Yue Liang, Sunnyvale, CA (US); Wen-Chien Chen, New Taipei (TW)

(73) Assignee: xMEMS Labs, Inc., Santa Clara, CA (US)

( * ) Notice: Subject to any disclaimer, the term of this patent is extended or adjusted under 35 U.S.C. 154(b) by 0 days.

(21) Appl. No.: 18/172,346

(22) Filed: Feb. 22, 2023

(65) Prior Publication Data

US 2023/0209241 A1 Jun. 29, 2023

Related U.S. Application Data

(63) Continuation-in-part of application No. 17/842,810, filed on Jun. 17, 2022, which is a continuation-in-part (Continued)

(51) Int. Cl.
*H04R 1/10* (2006.01)

(52) U.S. Cl.
CPC ......... *H04R 1/1041* (2013.01); *H04R 1/1016* (2013.01); *H04R 2460/11* (2013.01)

(58) Field of Classification Search
CPC ........................... H04R 1/1058; H04R 1/1016; H04R 2460/11; H04R 31/00; H04R 17/02;

(Continued)

(56) References Cited

U.S. PATENT DOCUMENTS 5,970,998 A 10/1999 Talbot
8,532,320 B2 9/2013 Nordahn (Continued)

FOREIGN PATENT DOCUMENTS

CN 101785327 A 7/2010
CN 104540776 A 4/2015

(Continued)

OTHER PUBLICATIONS

Shen Guohao et al., Structure optimization design for capacitive silicon-based MEMS microphone, Semiconductor Devices, vol. 43, No. 12, p. 912-917, China Academic Journal Electronic Publishing House. ,Dec. 3, 2018.

(Continued)

*Primary Examiner* — Carolyn R Edwards
*Assistant Examiner* — Julie X Dang
(74) *Attorney, Agent, or Firm* — Winston Hsu

(57) ABSTRACT

A venting device is disposed within a wearable sound device or to be disposed within the wearable sound device. The venting device includes an anchor structure, a film structure and an actuator. The film structure includes an anchor end anchored on the anchor structure and a free end, and the film structure is configured to form a vent or close the vent. The actuator is disposed on the film structure. The film structure partitions a space into a first volume and a second volume, and the first volume and the second volume are connected via the vent when the vent is formed. The venting device is controlled by the controller to seal the vent when the controller determines to close the vent.

19 Claims, 24 Drawing Sheets

Related U.S. Application Data of application No. 17/344,980, filed on Jun. 11, 2021, now Pat. No. 11,399,228.

(60) Provisional application No. 63/342,161, filed on May 16, 2022, provisional application No. 63/320,703, filed on Mar. 17, 2022, provisional application No. 63/171,919, filed on Apr. 7, 2021, provisional application No. 63/051,885, filed on Jul. 14, 2020, provisional application No. 63/050,763, filed on Jul. 11, 2020.

(58) Field of Classification Search
CPC ........................ H04R 2201/003; H04R 31/003; H04R 17/00; H04R 7/26; H04R 7/06; H04R 7/10; H04R 19/005; H04R 19/02; H04R 2440/01; H04R 2499/11; H04R 19/04; B81B 3/0072; B81B 2203/0315; B81B 2201/0257; B81B 2203/0118; B81B 2203/04; B81C 1/0015; B81C 2201/0132
USPC ..................................... 381/423, 424, 173, 97
See application file for complete search history.

(56) References Cited

U.S. PATENT DOCUMENTS 8,724,200 B1 5/2014 Wu
10,067,734 B2 9/2018 Watson
10,367,540 B1 7/2019 Medapalli
11,323,797 B2 5/2022 Liang
11,399,228 B2 7/2022 Liang
2003/0029705 A1* 2/2003 Qiu ........................ B81B 3/0051 200/181
2006/0131163 A1 6/2006 Mei
2007/0007858 A1 1/2007 Sorensen
2008/0267416 A1 10/2008 Goldstein
2011/0051985 A1* 3/2011 Hwang .................. H04R 17/00 381/396
2011/0103616 A1 5/2011 Kwon
2011/0181150 A1 7/2011 Mahameed
2012/0053393 A1 3/2012 Kaltenbacher
2012/0082335 A1 4/2012 Duisters
2013/0121509 A1 5/2013 Hsu
2013/0223023 A1 8/2013 Dehe
2014/0140558 A1* 5/2014 Kwong .................. H04R 3/007 381/345
2015/0163599 A1 6/2015 Shim
2015/0204940 A1 7/2015 Teeter
2015/0237438 A1 8/2015 Lee
2016/0176704 A1 6/2016 Cargill
2016/0381464 A1 12/2016 Elyada
2017/0011600 A1 1/2017 Joung
2017/0021391 A1 1/2017 Guedes
2017/0040012 A1 2/2017 Goldstein
2017/0041708 A1 2/2017 Barzen
2017/0164115 A1 6/2017 van Halteren
2017/0201192 A1* 7/2017 Tumpold ........... H10N 30/2047
2017/0217761 A1 8/2017 Chung
2017/0260044 A1 9/2017 Cargill
2017/0325030 A1* 11/2017 Stoppel .................. H04R 17/00
2018/0002168 A1 1/2018 Cargill
2018/0020194 A1 1/2018 Kim
2018/0120938 A1 5/2018 Frescas
2019/0039880 A1* 2/2019 Paci ...................... B81B 3/0024
2019/0098390 A1 3/2019 Carino
2019/0181776 A1 6/2019 Tumpold
2019/0208343 A1 7/2019 Monti
2019/0215620 A1 7/2019 Albahri
2019/0349665 A1 11/2019 Grinker
2020/0100033 A1* 3/2020 Stoppel ................ H04R 31/003
2020/0178000 A1 6/2020 Niekiel
2020/0178003 A1 6/2020 Zurbruegg
2020/0193973 A1 6/2020 Tolomei
2020/0196067 A1 6/2020 Rusconi Clerici Beltrami
2020/0211521 A1* 7/2020 Voss ......................... H04R 7/04
2020/0213770 A1 7/2020 Duan
2020/0244275 A1 7/2020 Marzin
2020/0352788 A1 11/2020 Van 'T Hof
2022/0014836 A1 1/2022 Liang

FOREIGN PATENT DOCUMENTS

CN 105009604 A 10/2015
CN 106937193 A 7/2017
CN 107223346 A 9/2017
CN 108702575 A 10/2018
CN 110022506 A 7/2019
CN 209402687 U 9/2019
CN 111063790 A 4/2020
EP 3 896 990 A1 10/2021
JP 11-307441 A 11/1999
JP 2009-512375 A 3/2009
JP 2012-249184 A 12/2012
JP 2017-112531 A 6/2017
JP 2020-31444 A 2/2020
JP 2022-16392 A 1/2022
KR 10-2010-0002351 A 1/2010
KR 10-2012-0034085 A 4/2012
KR 10-2015-0030691 A 3/2015
KR 10-2015-0097292 A 8/2015
KR 10-2017-0139320 A 12/2017
KR 10-2022-0007717 A 1/2022
TW I650025 B 2/2019
TW 202203662 A 1/2022
WO 2019/177324 A1 9/2019

OTHER PUBLICATIONS

Hua Qing et al., Acoustoeletric model of piezoelectric microphone with package structure, Transducer and Microsystem Technologies, 2018 vol. 37, No. 11, p. 42-44, China Academic Journal Electronic Publishing House. ,Nov. 30, 2018.

Chen Guidong et al., Highly sensitive MEMS humidity sensor based on candle-soot nanoparticle layer , Micronanoelectronic Technology, vol. 57, No. 1, p. 36-40, p. 48, China Academic Journal Electronic Publishing House ,Jan. 2020.

Liang, the specification, including the claims, and drawings in the U.S. Appl. No. 17/344,983, filed Jun. 11, 2021.

Hyonse Kim et al, A slim type microvalve driven by PZT films, Sensors and Actuators A: Physical, Jan. 18, 2005, pp. 162-171, vol. 121, Elsevier B. V., XP027806904.

Wang Zhicheng, Stylish structure and innovative features of new generation speakers, Household Electric Appliances, Issue 12, 2003, p. 38-40, China Academic Journal Electronic Publishing House ,2003.

Zhou Xiao-wei et al., Preliminary evaluation of predicative performance of BAHA softband in the conductive or mixed hearing loss patients, Journal of Otolaryngology and Ophthalmology of Shandong University, vol. 29, Issue No. 2, 2015, p. 28-30, China Academic Journal Electronic Publishing House. ,Apr. 16, 2015.

Stefan Liebich et al., active occlusion cancellation with hear-through equalization for headphones, Institute of Communication Systems, 2018 IEEE international conference on acoustics, speech and signal processing. Canada ,Apr. 2018.

* cited by examiner

VENTING DEVICE

CROSS REFERENCE TO RELATED APPLICATIONS

This application is a continuation-in-part of U.S. application Ser. No. 17/842,810, filed on Jun. 17, 2022, which is a continuation-in-part of U.S. application Ser. No. 17/344,980, filed on Jun. 11, 2021, which claims the benefit of U.S. Provisional Application No. 63/050,763, filed on Jul. 11, 2020, and claims the benefit of U.S. Provisional Application No. 63/051,885, filed on Jul. 14, 2020, and claims the benefit of U.S. Provisional Application No. 63/171,919, filed on Apr. 7, 2021. Besides, U.S. application Ser. No. 17/842,810 claims the benefit of U.S. Provisional Application No. 63/320,703, filed on Mar. 17, 2022. Further, this application claims the benefit of U.S. Provisional Application No. 63/342,161, filed on May 16, 2022. The contents of these applications are incorporated herein by reference.

BACKGROUND OF THE INVENTION

1. Field of the Invention

The present application relates to a venting device, and more particularly, to a venting device capable of eliminating an occlusion effect.

2. Description of the Prior Art

Nowadays, wearable sound devices, such as in-ear (insert into ear canal) earbuds, on-ear or over-ear earphones, etc. are generally used for producing sound or receiving sound. Magnet and moving coil (MMC) based microspeaker have been developed for decades and widely used in many such devices. Recently, MEMS (Micro Electro Mechanical System) acoustic transducers which make use of a semiconductor fabrication process can be sound producing/receiving components in the wearable sound devices.

Occlusion effect is due to the sealed volume of ear canal causing loud perceived sound pressure by the listener. For example, the occlusion effect occurs while the listener does specific motion(s) generating a bone-conducted sound (such as walking, jogging, talking, eating, touching the acoustic transducer, etc.) and uses the wearable sound device (e.g., the wearable sound device is filled in his/her ear canal). The occlusion effect is particularly strong toward bass due to the difference of acceleration based SPL (sound pressure level) generation ($SPL \propto a = dD^2/dt^2$) and compression based SPL generation ($SPL \propto D$). For instance, a displacement of merely 1 μm at 20 Hz will cause a SPL=1 μm/25 mm atm=106 dB in occluded ear canal (25 mm is average length of adult ear canals). Therefore, if the occlusion effect occurs, listener hears the occlusion noise, and the quality of listener experience is bad.

In the traditional technology, the wearable sound device has an airflow channel existing between the ear canal and the ambient external to the device, such that the pressure caused by the occlusion effect can be released from this airflow channel to suppress the occlusion effect. However, because the airflow channel always exists, in the frequency response, the SPL in the lower frequency (e.g., lower than 500 Hz) has a significant drop. For example, if the traditional wearable sound device uses a typical 115 dB speaker driver, the SPL in 20 Hz is much lower than 110 dB. In addition, if a size of a fixed vent configured to form the airflow channel is greater, the SPL drop will be greater, and the water and dust protection will become more difficult.

In some cases, the traditional wearable sound device may use a speaker driver stronger than the typical 115 dB speaker driver to compensate for the loss of SPL in lower frequency due to the existence of the airflow channel. For example, assuming the loss of SPL is 20 dB, then the required speaker driver to maintain the same 115 dB SPL in the presence of the airflow channel will be 135 dB SPL, were it to be used in a sealed ear canal. However, the 10× stronger bass output requires the speaker membrane travel to also increase by 10× which implies the heights of both the coil and the magnet flux gap of the speaker driver need to be increased by 10×. Thus, it is difficult to make the traditional wearable sound device having the strong speaker driver have the small size and light weight.

Therefore, it is necessary to improve the prior art, so as to suppress the occlusion effect.

SUMMARY OF THE INVENTION

It is therefore a primary objective of the present invention to provide a venting device capable of suppressing an occlusion effect.

An embodiment of the present invention provides a venting device disposed within a wearable sound device or to be disposed within the wearable sound device. The venting device includes an anchor structure, a film structure and an actuator. The film structure includes an anchor end anchored on the anchor structure and a free end, and the film structure is configured to form a vent or close the vent. The actuator is disposed on the film structure. The film structure partitions a space into a first volume and a second volume, and the first volume and the second volume are connected via the vent when the vent is formed. The venting device is controlled by the controller to seal the vent when the controller determines to close the vent.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
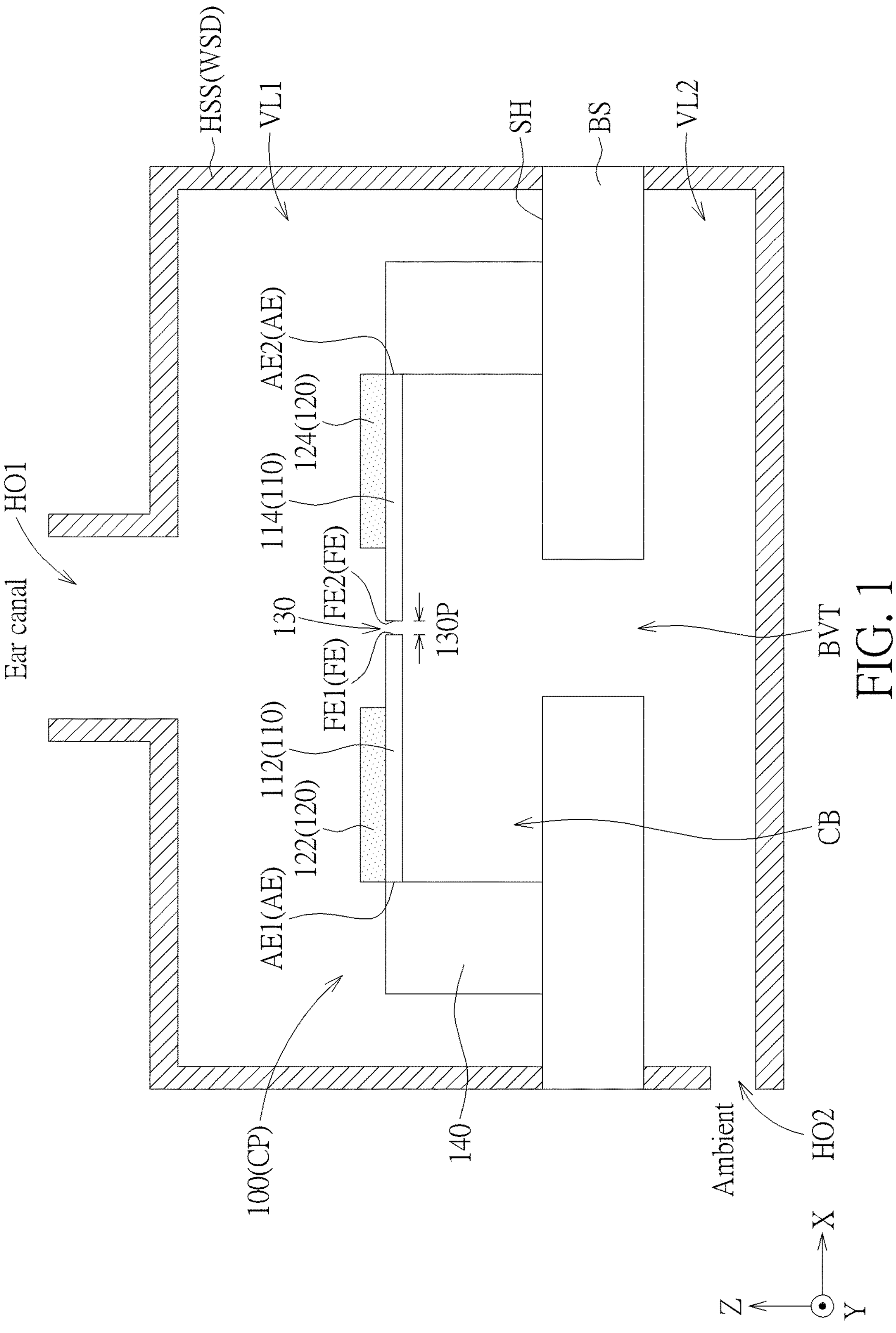
FIG. 1 is a schematic diagram of a cross sectional view illustrating a venting device and a housing structure according to a first embodiment of the present invention.

To provide a better understanding of the present invention to those skilled in the art, preferred embodiments and typical material or range parameters for key components will be detailed in the follow description. These preferred embodiments of the present invention are illustrated in the accompanying drawings with numbered elements to elaborate on the contents and effects to be achieved. It should be noted that the drawings are simplified schematics, and the material and parameter ranges of key components are illustrative based on the present day technology, and therefore show only the components and combinations associated with the present invention, so as to provide a clearer description for the basic structure, implementing or operation method of the present invention. The components would be more complex in reality and the ranges of parameters or material used may evolve as technology progresses in the future. In addition, for ease of explanation, the components shown in the drawings may not represent their actual number, shape, and dimensions; details may be adjusted according to design requirements.

In the following description and in the claims, the terms "include", "comprise" and "have" are used in an open-ended fashion, and thus should be interpreted to mean "include, but not limited to . . . ". Thus, when the terms "include", "comprise" and/or "have" are used in the description of the present invention, the corresponding features, areas, steps, operations and/or components would be pointed to existence, but not limited to the existence of one or a plurality of the corresponding features, areas, steps, operations and/or components.

In the following description and in the claims, when "a A1 component is formed by/of B1", B1 exist in the formation of A1 component or B1 is used in the formation of A1 component, and the existence and use of one or a plurality of other features, areas, steps, operations and/or components are not excluded in the formation of A1 component.

In the following description and in the claims, the term "substantially" generally means a small deviation may exist or not exist. For instance, the terms "substantially parallel" and "substantially along" means that an angle between two components may be less than or equal to a certain degree threshold, e.g., 10 degrees, 5 degrees, 3 degrees or 1 degree. For instance, the term "substantially aligned" means that a deviation between two components may be less than or equal to a certain difference threshold, e.g., 2 μm or 1 μm. For instance, the term "substantially the same" means that a deviation is within, e.g., 10% of a given value or range, or mean within 5%, 3%, 2%, 1%, or 0.5% of a given value or range.

In the description and following claims, the term "horizontal direction" generally means a direction parallel to a horizontal surface, the term "horizontal surface" generally means a surface parallel to a direction X and direction Y in the drawings (i.e., the direction X and the direction Y of the present invention may be considered as the horizontal directions), the term "vertical direction" generally means a direction parallel to a direction Z and perpendicular to the horizontal direction in the drawings, and the direction X, the direction Y and the direction Z are perpendicular to each other. In the description and following claims, the term "top view" generally means a viewing result viewing along the vertical direction. In the description and following claims, the term "cross-sectional view" generally means a viewing result viewing a structure cutting along the vertical direction along the horizontal direction.

Although terms such as first, second, third, etc., may be used to describe diverse constituent elements, such constituent elements are not limited by the terms. The terms are used only to discriminate a constituent element from other constituent elements in the specification, and the terms do not relate to the sequence of the manufacture if the specification do not describe. The claims may not use the same terms, but instead may use the terms first, second, third, etc. with respect to the order in which an element is claimed. Accordingly, in the following description, a first constituent element may be a second constituent element in a claim.

It should be noted that the technical features in different embodiments described in the following can be replaced, recombined, or mixed with one another to constitute another embodiment without departing from the spirit of the present invention.

In the present invention, a venting device (or a MEMS venting device) capable of suppressing an occlusion effect may be related to an acoustic apparatus and/or disposed within an acoustic apparatus (such as a wearable sound device). For instance, the venting device may be disposed within the wearable sound device (e.g., an in-ear device), but not limited thereto.

In the present invention, the acoustic apparatus may include an acoustic transducer configured to perform an acoustic transformation, wherein the acoustic transformation may convert signals (e.g. electric signals or signals with other suitable type) into an acoustic wave, or may convert an acoustic wave into signals with other suitable type (e.g. electric signals). In some embodiments, the acoustic transducer may be a sound producing device, a speaker, a micro speaker or other suitable device, so as to convert the electric signals into the acoustic wave, but not limited thereto. In some embodiments, the acoustic transducer may be a sound measuring device, a microphone or other suitable device, so as to convert the acoustic wave into the electric signals, but not limited thereto. Owing to the existence of the venting device of the present invention, the occlusion effect would be suppressed, so as to make the user have a good experience of the acoustic transformation provided by the acoustic apparatus.

In the following, the venting device of the present invention may be related to and disposed in the wearable sound device configured to produce the acoustic wave, and the following explanation is configured to make those skilled in the art better understand the present invention.

Figure 2:
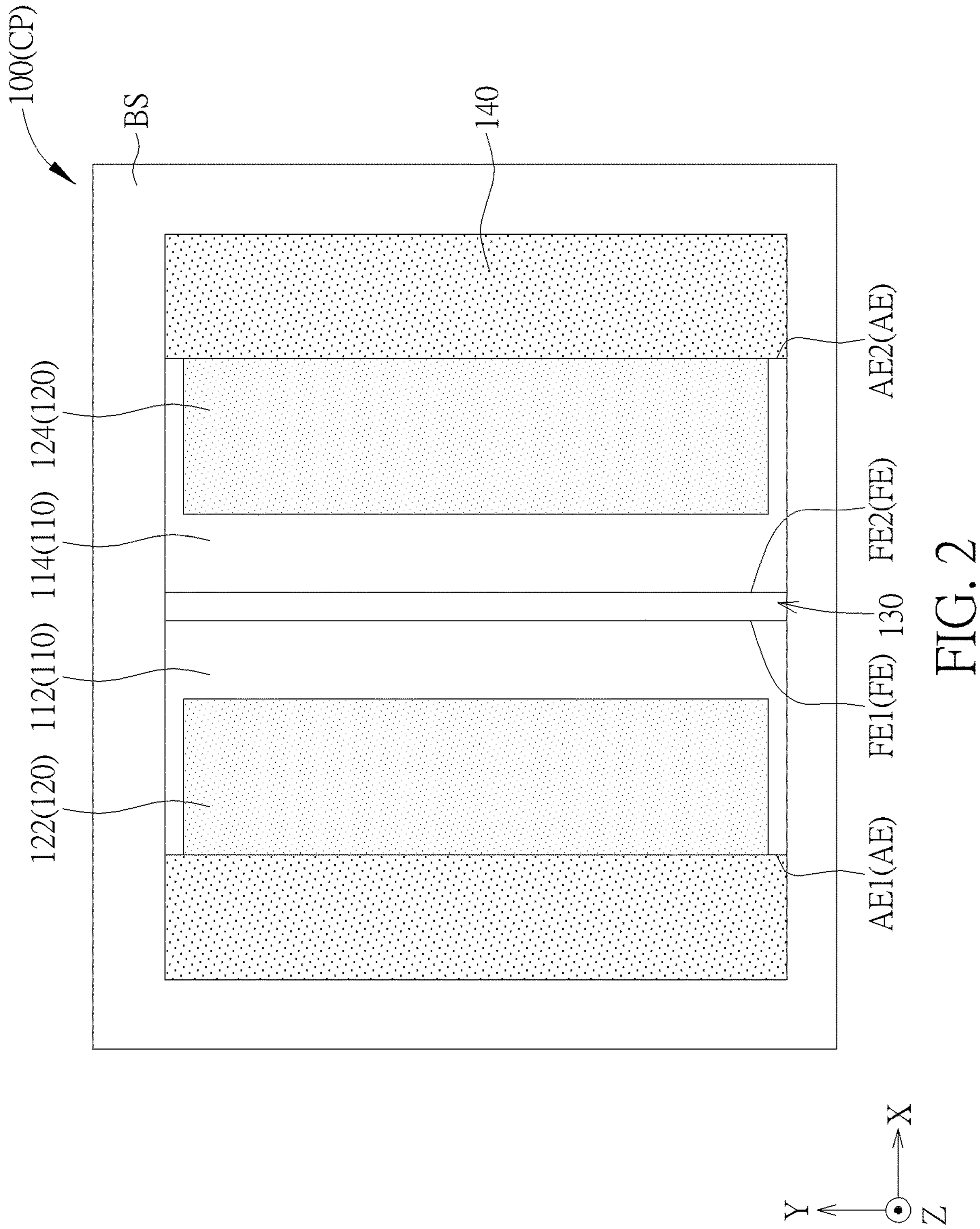
FIG. 2 is a schematic diagram of a top view illustrating a venting device according to the first embodiment of the present invention.
Figure 3:
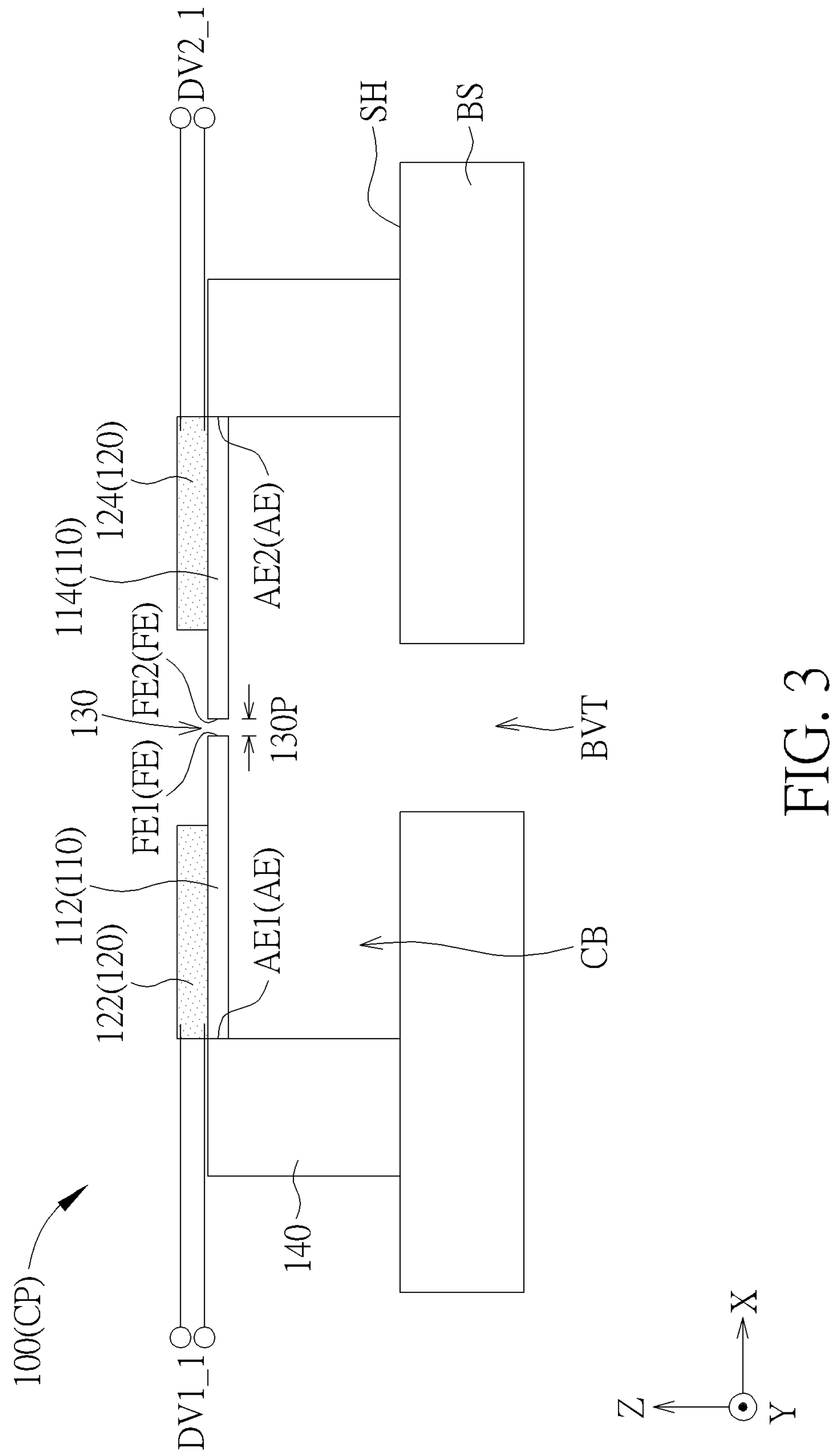
FIG. 3 to FIG. 5 are schematic diagrams of cross sectional views illustrating the film structure of the venting device at different positions according to the first embodiment of the present invention.
Figure 4:
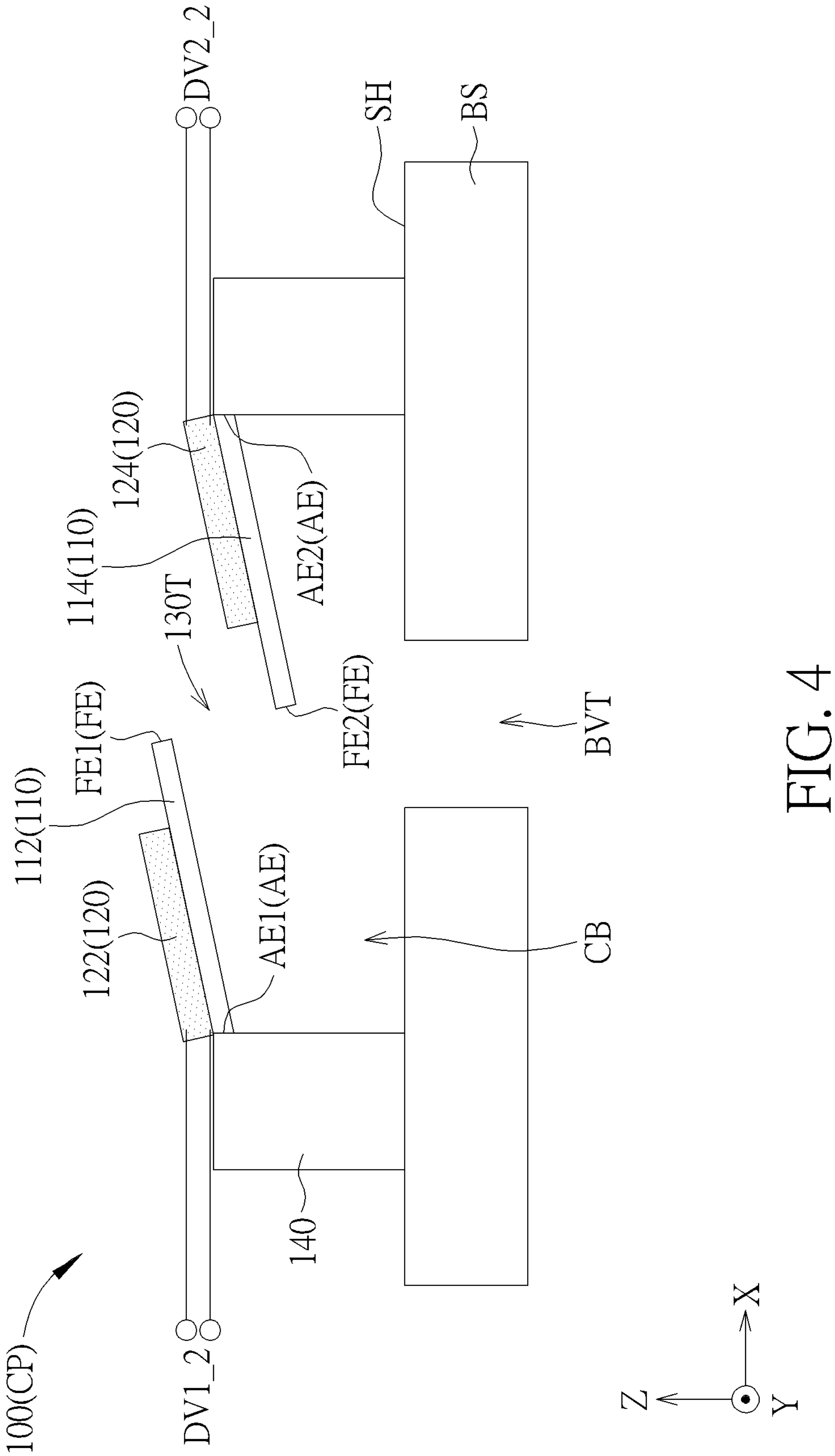
Figure 5:
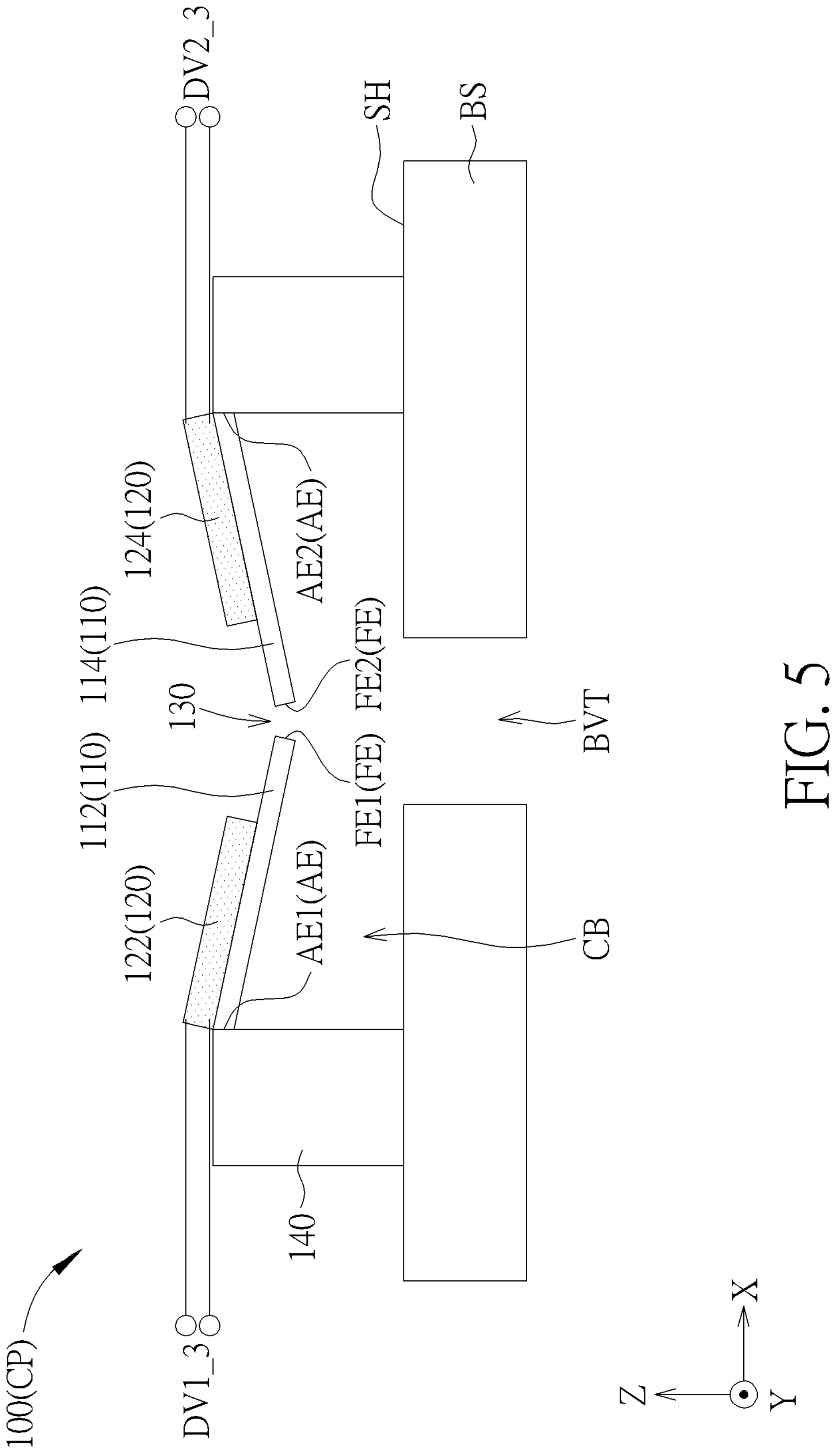

Referring to FIG. 1 to FIG. 5, FIG. 1 is a schematic diagram of a cross sectional view illustrating a venting device and a housing structure according to a first embodiment of the present invention, FIG. 2 is a schematic diagram of a top view illustrating a venting device according to the first embodiment of the present invention, and FIG. 3 to FIG. 5 are schematic diagrams of cross sectional views illustrating the film structure of the venting device at different positions according to the first embodiment of the present invention. As shown in FIG. 1 and FIG. 2, the venting device 100 may be disposed on a base BS. The base BS may be hard or flexible, wherein the base BS may include silicon, germanium, glass, plastic, quartz, sapphire, metal, polymer (e.g., polyimide (PI), polyethylene terephthalate (PET)), any other suitable material or a combination thereof. As an example, the base BS may be a circuit board including a laminate (e.g., copper clad laminate, CCL), a land grid array (LGA) board or any other suitable board containing conductive material, but not limited thereto. In some embodiments, the base BS may be a substrate.

In FIG. 1, the base BS has a top surface SH parallel to the direction X and the direction Y (i.e., the top surface SH of the base BS is a horizontal surface). In FIG. 1, a normal direction of the top surface SH of the base BS is parallel to the direction Z.

The venting device 100 includes at least one anchor structure 140 and a film structure 110 anchored by the anchor structure 140, wherein the anchor structure 140 is disposed outside the film structure 110. The film structure 110 and the anchor structure 140 may include any suitable material(s). In some embodiments, the film structure 110 and the anchor structure 140 may individually include silicon (e.g., single crystalline silicon or poly-crystalline silicon), silicon compound (e.g., silicon carbide, silicon oxide), germanium, germanium compound (e.g., gallium nitride or gallium arsenide), gallium, gallium compound, stainless steel or a combination thereof, but not limited thereto. In some embodiments, the film structure 110 and the anchor structure 140 may have the same material.

In the operation of the venting device 100, the film structure 110 may be actuated to have a movement, and the anchor structure 140 may be immobilized. Namely, the anchor structure 140 may be a fixed end (or fixed edge) respecting the film structure 110 during the operation of the venting device 100. In some embodiments, the film structure 110 may be actuated to move upwards and downwards, but not limited thereto. In the present invention, the terms “move upwards” and “move downwards” represent that the film structure 110 moves substantially along the direction Z.

As shown in FIG. 1 and FIG. 2, the film structure 110 of the venting device 100 includes at least one slit 130, such that the film structure 110 may have at least one anchor end AE anchored on the anchor structure 140 and at least one free end FE which is not permanently anchored on any component within the venting device 100. In some embodiments, the film structure 110 may be divided into a plurality of flaps by the slit(s) 130. For example, as shown in FIG. 1 and FIG. 2, the film structure 110 may be divided into a first flap 112 and a second flap 114 by the slit 130, wherein the first flap 112 and the second flap 114 are separated from each other, the first flap 112 may have a first anchor end AE1 (or first anchor edge) anchored on the anchor structure 140 and a first free end FE1 (or first free edge) opposite to the first anchor end AE1, the second flap 114 may have a second anchor end AE2 (or second anchor edge) anchored on the anchor structure 140 and a second free end FE2 (or second free edge) opposite to the second anchor end AE2, and two opposite sidewalls of the slit 130 respectively belongs to the first free end FE1 and the second free end FE2 (i.e., one sidewall belongs to the first free end FE1, another sidewall belongs to the second free end FE2). For example, the slit 130 may be a boundary of the film structure 110 and/or a boundary of the flap, but not limited thereto.

In the present invention, the number of the slit(s) 130 included in the film structure 110 may be adjusted based on requirement(s), and the slit(s) 130 may be disposed at any suitable position of the film structure 110 and have any suitable top-view pattern. For example, the slit 130 may be a straight slit, a curved slit, a combination of straight slits, a combination of curved slits or a combination of straight slit(s) and curved slit(s).

The venting device 100 includes an actuator 120 disposed on the film structure 110 and configured to actuate the film structure 110. For instance, in FIG. 1, the actuator 120 may be in contact with the film structure 110, but not limited thereto. As shown in FIG. 1, the actuator 120 may not totally overlap the film structure 110 in the direction Z, but not limited thereto.

As shown in FIG. 1 and FIG. 2, the actuator 120 may include a plurality of actuating portions disposed on the plurality of flaps of the film structure 110. For instance (as shown in FIG. 1), since the film structure 110 has the first flap 112 and the second flap 114, the actuator 120 includes a first actuating portion 122 disposed on the first flap 112 and a second actuating portion 124 disposed on the second flap 114.

The actuator 120 has a monotonic electromechanical converting function with respect to the movement of the film structure 110 along the direction Z. In some embodiments, the actuator 120 may include a piezoelectric actuator, an electrostatic actuator, a nanoscopic-electrostatic-drive (NED) actuator, an electromagnetic actuator or any other suitable actuator, but not limited thereto. For example, in an embodiment, the actuator 120 may include a piezoelectric actuator, the piezoelectric actuator may contain such as two electrodes and a piezoelectric material layer (e.g., lead zirconate titanate, PZT) disposed between the electrodes, wherein the piezoelectric material layer may actuate the film structure 110 based on driving signals (e.g., driving voltages and/or driving voltage difference between two electrodes) received by the electrodes, but not limited thereto. For example, in another embodiment, the actuator 120 may include an electromagnetic actuator (such as a planar coil), wherein the electromagnetic actuator may actuate the film structure 110 based on a received driving signals (e.g., driving current) and a magnetic field (i.e. the film structure 110 may be actuated by the electromagnetic force), but not limited thereto. For example, in still another embodiment, the actuator 120 may include an electrostatic actuator (such as conducting plate) or a NED actuator, wherein the electrostatic actuator or the NED actuator may actuate the film structure 110 based on a received driving signals (e.g., driving voltage) and an electrostatic field (i.e. the film structure 110 may be actuated by the electrostatic force), but not limited thereto. In the following, the actuator 120 may be a piezoelectric actuator for example.

In this embodiment, the venting device 100 may optionally include a chip CP disposed on the top surface SH of the base BS, wherein the chip CP may include the film structure 110, the anchor structure 140 and the actuator 120 at least. The manufacturing method of the chip CP is not limited. For example, in this embodiment, the chip CP may be formed by at least one semiconductor process to be a MEMS chip, but not limited thereto.

In addition, as shown in FIG. 1, a chamber CB may exist between the base BS and the film structure 110. As shown in FIG. 1, the base BS may further include a back opening BVT, and the chamber CB may be connected to the rear outside of the venting device 100 (i.e., a space back of the base BS) through the back opening BVT.

As shown in FIG. 1, the venting device 100 and the base BS are disposed within a housing structure HSS inside the wearable sound device WSD. In FIG. 1, the housing structure HSS may have a first housing opening HO1 and a second housing opening HO2, wherein the first housing opening HO1 may be connected to an ear canal of a wearable sound device user, the second housing opening HO2 may be connected to an ambient of the wearable sound device WSD, and the film structure 110 is between the first housing opening HO1 and the second housing opening HO2. Note that the ambient of the wearable sound device WSD may not inside the ear canal (e.g., the ambient of the wearable sound device WSD may be directly connected to the space outside the ear). Furthermore, in FIG. 1, since the chamber CB may exist between the base BS and the film structure 110, the chamber CB may be connected to the ambient of the wearable sound device WSD through the back opening BVT of the base BS and the second housing opening HO2 of the housing structure HSS.

As shown in FIG. 1, the film structure 110 of the venting device 100 partitions a space formed within the housing structure HSS into a first volume VL1 to be connected to the ear canal of the wearable sound device user and a second volume VL2 to be connected to the ambient of the wearable sound device WSD. In FIG. 1, the first volume VL1 is connected to the first housing opening HO1 of the housing structure HSS, and the second volume VL2 is connected to the second housing opening HO2 of the housing structure HSS. Thus, the first volume VL1 is to be connected to the ear canal of the wearable sound device user through the first housing opening HO1, and the second volume VL2 is to be connected to the ambient of the wearable sound device WSD through the second housing opening HO2. As shown in FIG. 1, the chamber CB is a portion of the second volume VL2.

The film structure 110 may be actuated to move upwards and downwards by the actuator 120. Therefore, as shown in FIG. 1 to FIG. 5, the first free end FE1 of the first flap 112 may be configured to perform a first up-and-down movement, and the second free end FE2 of the second flap 114 may be configured to perform a second up-and-down movement. Based on the requirement(s), a moving direction of the first up-and-down movement of the first free end FE1 may be the same as or opposite to a moving direction of the second up-and-down movement of the second free end FE2.

As shown in FIG. 1 to FIG. 5, the film structure 110 may be actuated to move upwards and downwards by the actuator 120, such that a vent 130T related to the slit 130 is formed or closed (i.e., the film structure 110 is configured to form the vent 130T or close the vent 130T), wherein the vent 130T is formed between two opposite sidewalls of the slit 130 (i.e., the vent 130T is formed because of the slit 130). When the venting device 100 is in a first mode to make the vent 130T temporarily closed (e.g., FIG. 1 and FIG. 3), the first volume VL1 is substantially disconnected from the second volume VL2, such that the ambient of the wearable sound device WSD and the ear canal of the wearable sound device user are substantially separated (isolated) from each other. On the contrary, when the venting device 100 is in a second mode to make the vent 130T temporarily formed (e.g., FIG. 4), the first volume VL1 is to be connected to the second volume VL2 through the vent 130T, such that the ambient of the wearable sound device WSD and the ear canal of the wearable sound device user are connected to each other. In the present invention, because the vent 130T is temporarily closed in the first mode and the vent 130T is temporarily formed in the second mode, the airflow flowing between the first volume VL1 and the second volume VL2 in the first mode is much less than the airflow flowing between the first volume VL1 and the second volume VL2 in the second mode.

In the condition "the vent 130T is closed", the air is hard to flow between the first volume VL1 and the second volume VL2 through a space between two opposite sidewalls of the slit 130. In the condition "the vent 130T is formed/opened", the air easily flows between the first volume VL1 and the second volume VL2 through a space between two opposite sidewalls of the slit 130. In some embodiments, an opening size between two opposite sidewalls of the slit 130 in the first mode (i.e., the vent 130T is closed) is much less than an opening size between two opposite sidewalls of the slit 130 in the second mode (i.e., the vent 130T is formed/opened). For instance, when the vent 130T is closed, the film structure 110 is parallel or substantially parallel to the top surface SH of the base BS, and two opposite sidewalls of the slit 130 partially or fully overlap with each other in the horizontal direction, but not limited thereto. For instance, when the vent 130T is formed/opened, the film structure 110 is not parallel or not substantially parallel to the top surface SH of the base BS.

FIG. 1 and FIG. 3 show an example of the venting device 100 in the first mode. As shown in FIG. 1 and FIG. 3, the film structure 110 is actuated and maintained as a first position parallel or substantially parallel to the top surface SH of the base BS, so as to make the vent 130T closed. For example, in FIG. 1 and FIG. 3, two opposite sidewalls of the slit 130 partially or fully overlap with each other in the horizontal direction, so as to make the vent 130T closed. In FIG. 1 and FIG. 3, since the film structure 110 has the first flap 112 and the second flap 114, the first flap 112 and the second flap 114 are actuated and maintained as their first positions to close the vent 130T.

As shown in FIG. 1 and FIG. 3, since the film structure 110 is actuated and maintained as the first position, a gap 130P exists between two opposite sidewalls of the slit 130. For instance, the gap 130P may exist between two opposite sidewalls of the slit 130 in a plane parallel to the top surface SH of the base BS, wherein the gap 130P shall refer to a space widthwise along the slit 130, and the width of the gap 130P may be equal to or substantially equal to the width of the slit 130, but not limited thereto. The width of the slit 130 (the width of the gap 130P) may be designed based on requirement(s). For instance, the width of the slit 130 may be less than or equal to 5 μm, less than or equal to 3 μm, or less than or equal to 2 μm, or may range from 1 μm to 2 μm, but not limited thereto.

Since the width of the gap 130P should be sufficiently small, the airflow through the gap 130P (i.e., a narrow channel) can be highly damped due to viscous forces/resistance along the walls of the airflow pathways, known as boundary layer effect within field of fluid mechanics. Accordingly, the airflow flowing between the first volume VL1 and the second volume VL2 through the gap 130P in the first mode is significantly small or negligible. In other words, when the venting device 100 is in the first mode, the vent 130T is closed and even sealed.

In the first mode, since the airflow flowing between the first volume VL1 and the second volume VL2 through the gap 130P in the first mode is significantly small or negligible, the wearable sound device user would experience the acoustic transformation with high performance (e.g. high performance sound) in whole audio frequency range, wherein the acoustic transformation is provided by the acoustic transducer of the wearable sound device WSD.

FIG. 4 shows an example of the venting device 100 in the second mode. As shown in FIG. 4, the first flap 112 (e.g., the first free end FE1) may be actuated to move toward a first direction, and the second flap 114 (e.g., the second free end FE2) may be actuated to move toward a second direction opposite to the first direction, such that the vent 130T is temporarily formed between two opposite sidewalls of the slit 130 in the direction Z. Namely, the moving direction of the first up-and-down movement of the first free end FE1 of the first flap 112 is opposite to moving direction of the second up-and-down movement of the second free end FE2 of the second flap 114. For example, the first direction and the second direction may be substantially parallel to the direction Z. For example (as shown in FIG. 4), one of the first free end FE1 and the second free end FE2 moves above the first position and a flat position (the flat position is parallel to the top surface SH of the base BS), and another one of the first free end FE1 and the second free end FE2 moves below the first position and the flat position, but not limited thereto.

When the vent 130T is temporarily opened, the airflow may be formed to flow between the first volume VL1 and the second volume VL2 due to the pressure difference between the two sides of the film structure 110, such that the pressure caused by the occlusion effect may be released (i.e., the pressure difference between the ear canal and the ambient of the wearable sound device WSD may be released through the airflow flowing through the vent 130T), so as to suppress the occlusion effect.

In the present invention, the size of the vent 130T may be determined by the distance between the first free end FE1 of the first flap 112 and the second free end FE2 of the second flap 114. The effect of suppressing the occlusion effect may be enhanced by increasing the size of the vent 130T.

Accordingly, as shown in FIG. 3 and FIG. 4, the gap 130P exists between two opposite sidewalls of the slit 130 in the first mode, and the vent 130T exists between two opposite sidewalls of the slit 130 in the second mode. The airflow through the gap 130P in the first mode may be much smaller compared to the airflow through the vent 130T in the second mode (e.g., the airflow through the gap 130P in the first mode may be negligible or 10 times lower than the airflow through the vent 130T in the second mode). In other words, the width of the gap 130P is sufficiently small such that, the airflow/leakage through the gap 130P in the first mode is negligible compared to (e.g., less than 10% of) the airflow through the vent 130T in the second mode.

In transition from the first mode, such as the one illustrated in FIG. 3, to the second mode, such as the one shown in FIG. 4, the first free end FE1 of the first flap 112 may move upwards while the second free end FE2 of the second flap 114 may move downwards. Conversely, in transition from the second mode shown in FIG. 4 back to the first mode shown in FIG. 3, the first free end FE1 of the first flap 112 may move downwards while the second free end FE2 of the second flap 114 may move upwards.

In addition, in transition from the first mode shown in FIG. 3 to the second mode shown in FIG. 4 or in transition from the second mode shown in FIG. 4 back to the first mode shown in FIG. 3, the first free end FE1 of the first flap 112 may be actuated to have a first displacement Uz_a toward the first direction, and the second free end FE2 of the second flap 114 may be actuated to have a second displacement Uz_b toward the second direction. In transition from the first mode to the second mode, the sum of the first displacement Uz_a and the second displacement Uz_b may be greater than the thickness of the film structure 110.

In an embodiment, the first displacement Uz_a and the second displacement Uz_b may be of substantially equal in distance, but opposite in direction. The first displacement Uz_a of the first free end FE1 of the first flap 112 and the second displacement Uz_b of the second free end FE2 of the second flap 114 may be (temporarily) symmetrical. The movements of the first free end FE1 and the second free end FE2 are substantially equal length wise, but opposite in direction over any period of time. Namely, if the first flap 112 and the second flap 114 are maintained as their first positions to be the first mode (as shown in FIG. 3), when the film structure 110 is actuated to change to the second mode or in the transition between the first mode and the second mode (e.g., transition from the first mode to the second mode), a moving distance of the first flap 112 respecting its first position may be equal to a moving distance of the second flap 114 respecting its first position (as shown in FIG. 4).

When the movements of the first free end FE1 and the second free end FE2 are temporarily symmetrical, regarding one slit 130, a first air movement is produced because the first flap 112 is actuated to move toward the first direction, a direction of the first air movement is related to the first direction, a second air movement is produced because the second flap 114 is actuated to move toward the second direction opposite to the first direction, and a direction of the second air movement is related to the second direction. Since the first air movement and the second air movement may be respectively related to the opposite directions, at least a portion of the first air movement and at least a portion of the second air movement may cancel each other when the first flap 112 and the second flap 114 are simultaneously actuated to open/close the vent 130T.

In some embodiments, the first air movement and the second air movement may substantially cancel each other when the first flap 112 and the second flap 114 are simultaneously actuated to open/close the vent 130T (for example, the first displacement Uz_a toward the first direction and the second displacement Uz_b toward the second direction may be equal in distance but opposite in direction). Namely, a net air movement produced due to opening/closing the vent 130T, which contains the first air movement and the second air movement, is substantially zero. As the result, since the net air movement is substantially zero during the opening and/or closing operation of the vent 130T, the operations of the vent 130T produces no acoustic disturbance perceivable to the user of the venting device 100, and the opening and/or closing operation of the vent 130T is said to be "concealed".

Optionally, as shown in FIG. 5, the venting device 100 may further include a third mode, wherein the film structure 110 bends downwards and is below the first position and the flat position. In FIG. 5, the first free end FE1 of the first flap 112 and the second free end FE2 of the second flap 114 may move/bend toward the base BS in the third mode (i.e., the film structure 110 hangs downwards).

In the third mode shown in FIG. 5, the vent 130T is substantially closed, but a width of a space existing between two opposite sidewalls of the slit 130 in the third mode is greater than the width of the gap 130P existing between two opposite sidewalls of the slit 130 in the first mode (as shown in FIG. 3). Thus, as shown in FIG. 3 to FIG. 5, the airflow through the space existing between two opposite sidewalls of the slit 130 in the third mode may be much smaller compared to the airflow through the vent 130T in the second mode, but the airflow through the space existing between two opposite sidewalls of the slit 130 in the third mode may be greater compared to the airflow through the gap 130P in the first mode.

Moreover, as shown in FIG. 3 to FIG. 5, in the first mode, the second mode, the third mode and the transition between two modes, the first free end FE1 of the first flap 112 makes no physical contact with any other component within the venting device 100 when the first free end FE1 performs the first up-and-down movement, and the second free end FE2 of the second flap 114 makes no physical contact with any other component within the venting device 100 when the second free end FE2 performs the second up-and-down movement.

Figure 6:
FIG. 6 is a schematic diagram illustrating frequency responses of the venting device of which the film structure situated at different positions according to the first embodiment of the present invention.

FIG. 6 illustrates frequency responses of the venting device 100 of which the film structure 110 situated at different positions, wherein FIG. 6 illustrates the frequency responses of the venting device 100 in the first mode (as shown in FIG. 3), the second mode (as shown in FIG. 4) and the third mode (as shown in FIG. 5) respectively. As shown in FIG. 6, since the vent 130T is closed in the first mode and the third mode, the low frequency roll-off (LFRO) corner frequencies in the first mode and the third mode are low, and the SPL drop of the low frequency in the first mode and the SPL drop of the low frequency in the third mode are not evident. As shown in FIG. 6, since the vent 130T is opened in the second mode, the LFRO corner frequency in the second mode is significantly higher than the LFRO corner frequencies in the first mode and the third mode, and the SPL drop of the low frequency in the second mode is evident. For instance, since the width of the gap 130P should be sufficiently small in the first mode (as shown in FIG. 3), as shown in FIG. 6, the LFRO corner frequency of the SPL in the first mode may be 35 Hz or lower, and lower than the LFRO corner frequency of the SPL in the third mode, but not limited thereto. For instance, when the vent 130T is opened/formed in the second mode (as shown in FIG. 4), as shown in FIG. 6, the LFRO corner frequency in the second mode may fall between 80 to 400 Hz, depends on the opening size of the vent 130T, but not limited thereto.

The actuator 120 may receive at least one suitable driving signal to actuate the film structure 110, so as to make the film structure 110 maintain or change its position, thereby causing the mode of the venting device 100 to be maintained or changed. As shown in FIG. 3 to FIG. 5, the venting device 100 may be switched to the first mode, the second mode or the third mode based on the driving signal(s) received by the actuator 120. In the case that the film structure 110 is divided into a plurality of flaps (e.g., FIG. 3 to FIG. 5), the actuating portions of the actuator 120 may receive the same driving signal or different driving signals. For example, when the actuator 120 is a piezoelectric actuator, the driving signal(s) may be driving voltage(s) and/or driving voltage difference(s) between two electrodes, and the displacement of the film structure 110 (the displacement of the free end FE) and the driving signal may have a linear relationship.

As shown in FIG. 3, in the first mode, the first actuating portion 122 disposed on the first flap 112 receives a driving signal DV1_1, and the second actuating portion 124 disposed on the second flap 114 receives a driving signal DV2_1. The first flap 112 and the second flap 114 move to the first position or are maintained as the first position according to the driving signal DV1_1 and the driving signal DV2_1, so as to close the vent 130T. The driving signal DV1_1 and the driving signal DV2_1 may be designed based on requirement(s). In some embodiments, the driving signal DV1_1 may be a constant voltage with a first threshold value, the driving signal DV2_1 may be a constant voltage with a second threshold value, and the driving signal DV1_1 and the driving signal DV2_1 may be the same or substantially the same (i.e., the first threshold value is the same as or substantially the same as second threshold value), but not limited thereto. For instance, the driving signal DV1_1 and the driving signal DV2_1 may be 15V, but not limited thereto. For instance, the power consumed by the venting device 100 in the first mode may be 0.16 mW, but not limited thereto.

As shown in FIG. 4, in the second mode, the first actuating portion 122 disposed on the first flap 112 receives a driving signal DV1_2, and the second actuating portion 124 disposed on the second flap 114 receives a driving signal DV2_2. According to the driving signal DV1_2 and the driving signal DV2_2, one of the first free end FE1 and the second free end FE2 (e.g., the first free end FE1 in FIG. 4) moves above the first position and the flat position, and another one of the first free end FE1 and the second free end FE2 (e.g., the second free end FE2 in FIG. 4) moves below the first position and the flat position, so as to form the vent 130T. The driving signal DV1_2 and the driving signal DV2_2 may be designed based on requirement(s). In some embodiments, the driving signal DV1_2 may be a constant voltage higher (or lower) than the first threshold value, the driving signal DV2_2 may be a constant voltage lower (or higher) than the second threshold value, and the driving signal DV1_2 and the driving signal DV2_2 may be different. For instance, the driving signal DV1_2 may be 30V, and the driving signal DV2_2 may be 0V, but not limited thereto. For instance, the power consumed by the venting device 100 in the second mode may be 0.2 mW, but not limited thereto.

In the present invention, since the size of the vent 130T may be determined by the distance between the first free end FE1 of the first flap 112 and the second free end FE2 of the second flap 114, the size of the vent 130T may be changed and controlled by the driving signal(s) based on requirement(s).

In addition, due to the design of the driving signal DV1_2 and the driving signal DV2_2, the movements of the first free end FE1 and the second free end FE2 are temporarily symmetrical with respect to the first position and the flat position. For example, a different between the driving signal DV1_2 and the first threshold value may be the same as a different between the driving signal DV2_2 and the second threshold value, but not limited thereto.

As shown in FIG. 5, in the third mode, the first actuating portion 122 disposed on the first flap 112 receives a driving signal DV1_3, and the second actuating portion 124 disposed on the second flap 114 receives a driving signal DV2_3. According to the driving signal DV1_3 and the driving signal DV2_3, the first free end FE1 and the second free end FE2 move below the first position and the flat position (i.e., the film structure 110 hangs downwards), so as to close the vent 130T. The driving signal DV1_3 and the driving signal DV2_3 may be designed based on requirement(s). In some embodiments, the driving signal DV1_3 may be a constant voltage lower than the first threshold value, the driving signal DV2_3 may be a constant voltage lower than the second threshold value, and the driving signal DV1_3 and the driving signal DV2_3 may be the same or substantially the same, but not limited thereto. For instance, the driving signal DV1_3 and the driving signal DV2_3 may be 0V or ground voltage, but not limited thereto. In some embodiments, the first actuating portion 122 and the second actuating portion 124 may be floating, but not limited thereto. For instance, the power consumed by the venting device 100 in the third mode may be 0.3 μW, but not limited thereto.

According to the driving signals in these modes, the venting device 100 has the lowest power consumption in the third mode. In some embodiments, no voltage is applied on the actuator 120 (i.e., the driving signal applied on the actuator 120 is 0V or ground voltage, or the actuator 120 is floating) in the third mode. Therefore, in order to decrease the power consumption of the venting device 100, the venting device 100 may be in the third mode normally (i.e., the vent 130T is closed), and the venting device 100 may be changed to the first mode or the second mode if necessary (e.g., the venting device 100 may be changed to the first mode for the acoustic transformation with high performance, the venting device 100 may be changed to the second mode for suppressing the occlusion effect), but not limited thereto.

In some embodiments, the driving signal applied on the first actuating portion 122 and the driving signal applied on the second actuating portion 124 may be unipolar with respect to the ground voltage. For example, according to the aforementioned driving signals DV1_1, DV1_2, DV1_3, DV2_1, DV2_2 and DV2_3, the driving signal applied on the first actuating portion 122 and the driving signal applied on the second actuating portion 124 may range from 0V to 30V, but not limited thereto.

In the present invention, the driving signal applied on the actuator 120 does not exceed a breakdown voltage of the actuator 120, so as to make the operation of the venting device 100 stable or to make the venting device 100 less distorted, but not limited thereto. For example, if the driving signal applied on the actuator 120 is greater than 0V, the driving signal may be less than an maximum voltage output from a controller (e.g., a driving circuit), but not limited thereto.

According to the above, the slit 130 of the present invention may be driven to serve as a dynamic front vent of the venting device 100, wherein the first volume VL1 and the second volume VL2 in the housing structure HSS are connected when the dynamic front vent is opened/formed, and the first volume VL1 and the second volume VL2 in the housing structure HSS are separated from each other when the dynamic front vent is closed.

Moreover, the venting device 100 of the present invention may have the better water protection and the better dust protection due to the dynamic front vent.

Figure 7:
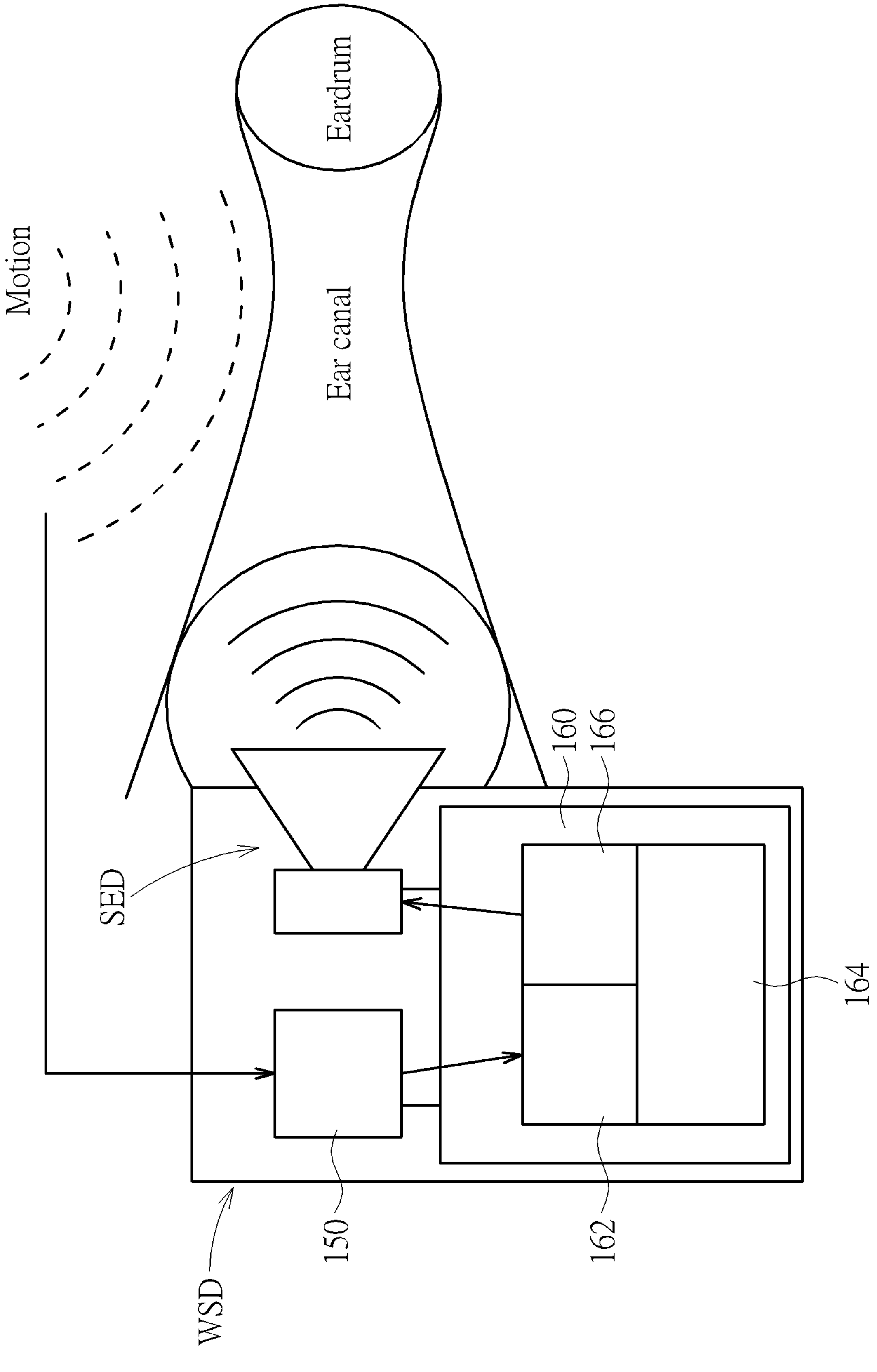
FIG. 7 is a schematic diagram illustrating a wearable sound device with the venting device according to an embodiment of the present invention.

Referring to FIG. 7, FIG. 7 is a schematic diagram illustrating a wearable sound device with the venting device according to an embodiment of the present invention. As shown in FIG. 7, the wearable sound device WSD may further include a sensing device 150 and a controller 160 electrically connected to the sensing device 150, the acoustic transducer and the venting device 100 (e.g., the actuator 120 of the venting device 100). In FIG. 7, the component SED includes the acoustic transducer and the venting device 100, so as to make FIG. 7 simple and clear.

The sensing device 150 may be configured to sense any required factor outside the wearable sound device WSD and corresponding to generate a sensing result. For example, the sensing device 150 may use an infrared (IR) sensing method, an optical sensing method, an acoustic sensing method, an ultrasonic sensing method, a capacitive sensing method or other suitable sensing method to sense any required factor, but not limited thereto.

In some embodiments, whether the vent 130T is formed is determined according to the sensing result. The vent 130T is opened (or formed) when a sensed quantity indicated by the sensing result crosses a certain threshold with a first polarity, and the vent 130T is closed when the sensed quantity crosses the certain threshold with a second polarity opposite to the first polarity. For instance, the first polarity may be from low to high, and the second polarity may be from high to low, such that the vent 130T is opened when the sensed quantity is changed from lower than the certain threshold to higher than the certain threshold, and the vent 130T is closed when the sensed quantity is changed from higher than the certain threshold to lower than the certain threshold, but not limited thereto.

Moreover, in some embodiments, a degree of opening of the vent 130T may be monotonically related to the sensed quantity indicated by the sensing result. Namely, the degree of opening of the vent 130T increases or decreases as the sensed quantity increases or decreases.

In some embodiments, the sensing device 150 may optionally include a motion sensor configured to detect a body motion of the user and/or a motion of the wearable sound device WSD. For example, the sensing device 150 may detect the body motion causing the occlusion effect, such as walking, jogging, talking, eating, etc. In some embodiments, the sensed quantity indicated by the sensing result represents the body motion of the user and/or the motion of the wearable sound device WSD, and the degree of opening of the vent 130T is correlated to the motion sensed. For instance, the degree of opening of the vent 130T increases as the motion increases.

In some embodiments, the sensing device 150 may optionally include a proximity sensor configured to sense a distance between an object and the proximity sensor. In some embodiments, the sensed quantity indicated by the sensing result represents the distance between the object and the proximity sensor, and the degree of opening of the vent 130T is correlated to the distance sensed. For instance, the vent 130T is opened (or formed) when this distance smaller than a predetermined distance, and the degree of opening of the vent 130T increases as this distance decreases. For instance, if the user wants to open (or form) the vent 130T, the user can use any suitable object (e.g., the hand) to approach the wearable sound device WSD, so as to make the proximity sensor sense this object to correspondingly generate the sensing result, thereby open/form the vent 130T.

In addition, the proximity sensor may further have a function for detecting that the user (predictably) taps or touches the wearable sound device WSD having the venting device 100 because these motions may also cause the occlusion effect.

In some embodiments, the sensing device 150 may optionally include a force sensor configured to sense the force applied on the force sensor of the wearable sound device WSD, the sensed quantity indicated by the sensing result represents the force pressing on the wearable sound device WSD, and the degree of opening of the vent 130T is correlated to the force sensed.

In some embodiments, the sensing device 150 may optionally include a light sensor configured to sense an ambient light of the wearable sound device WSD, the sensed quantity indicated by the sensing result represents the luminance of the ambient light sensed by the light sensor, and the degree of opening of the vent 130T is correlated to the luminance of the ambient light sensed.

In some embodiments, the sensing device 150 may optionally include an acoustic sensor, such as microphone, configured to sense the sound outside the wearable sound device WSD to detect the occlusion event. For example, the sensed quantity indicated by the sensing result represents the SPL of the sound sensed by the acoustic sensor, and the degree of opening of the vent 130T is correlated to the sound sensed by the acoustic sensor, but not limited thereto. For example, the venting device 100 is actuated to open the vent 130T when the acoustic sensor detects that the occlusion event occur, but not limited thereto.

The controller 160 is configured to generate the driving signals applied on the acoustic transducer and the venting device 100, so as to control the acoustic transducer to perform the acoustic transformation and to control the mode of the venting device 100.

The controller 160 may be designed based on requirement(s), and the controller 160 may include any suitable component. For example, in FIG. 7, the controller 160 may include an analog-to-digital converter (ADC) 162, a digital signal processing (DSP) unit 164, a digital-to-analog converter (DAC) 166, any other suitable component or a combination thereof. For example, the controller 160 may be an integrated circuit, but not limited thereto.

The controller 160 generates the driving signals applied on the actuator 120 of the venting device 100, so as to control the mode of the venting device 100. Thus, the controller 160 controls the venting device 100 to form the vent 130T for suppressing the occlusion effect or close the vent 130T for making wearable sound device user experience the acoustic transformation with high performance in whole audio frequency range.

As shown in FIG. 3 and FIG. 5, the venting device 100 is controlled by the controller 160 to close/seal the vent 130T (the venting device 100 is in the first mode or the third mode) when the controller 160 determines to close the vent 130T. Thus, in FIG. 3, the driving signal DV1_1 and the driving signal DV2_1 are respectively applied on the first actuating portion 122 and the second actuating portion 124, so as to make the first flap 112 and the second flap 114 move to the first position or are maintained as the first position, thereby closing/sealing the vent 130T. In FIG. 5, the driving signal DV1_3 and the driving signal DV2_3 are respectively applied on the first actuating portion 122 and the second actuating portion 124, so as to make the first flap 112 and the second flap 114 move to (or maintain as) a position below the first position and the flat position, thereby closing the vent 130T.

In particular, in the third mode shown in FIG. 5, the driving signal DV1_3 and the driving signal DV2_3 may be 0V or ground voltage, or the first actuating portion 122 and the second actuating portion 124 may be floating. Thus, in some embodiments, when the controller 160 determines to close the vent 130T and determines to make the venting device 100 in the third mode, no voltage is applied on the actuator 120 (i.e., no voltage is applied on the first actuating portion 122 and the second actuating portion 124), so as to make the vent 130T closed.

As shown in FIG. 4, the venting device 100 is controlled by the controller 160 to form the vent 130T (the venting device 100 is in the second mode) when the controller 160 does not determine to close the vent 130T (e.g., the controller 160 determines to form the vent 130T). Thus, in FIG. 3, the driving signal DV1_2 and the driving signal DV2_2 are respectively applied on the first actuating portion 122 and the second actuating portion 124, so as to control the first flap 112 and the second flap 114 to form the vent 130T. For example, the first flap 112 (e.g., the first free end FE1) is actuated to move toward the first direction for reaching a position above the first position, and the second flap 114 (e.g., the second free end FE2) may be actuated to move toward the second direction opposite to the first direction for reaching a position below the first position.

In some embodiments, the driving signals applied on the actuator 120 of the venting device 100 may be generated according to the sensing result, but not limited thereto. In some embodiments, since the degree of opening of the vent 130T may be monotonically related to the sensed quantity indicated by the sensing result, the driving signals applied on the actuator 120 may have a monotonic relationship with the sensed quantity indicated by the sensing result.

When the sensing device 150 includes the motion sensor, magnitudes of the driving signals applied on the actuator 120 may increase (or decrease) as the motion increases, but not limited thereto. Similarly, when the sensing device 150 includes the proximity sensor, magnitudes of the driving signals applied on the actuator 120 may increase (or decrease) as the distance decreases or decreases below a threshold, but not limited thereto. Similarly, when the sensing device 150 includes the force sensor, magnitudes of the driving signals applied on the actuator 120 may increase (or decrease) as the force increases, but not limited thereto. Similarly, when the sensing device 150 includes the light sensor, magnitudes of the driving signals applied on the actuator 120 may increase (or decrease) as the luminance of the ambient light decreases, but not limited thereto.

Figure 8:
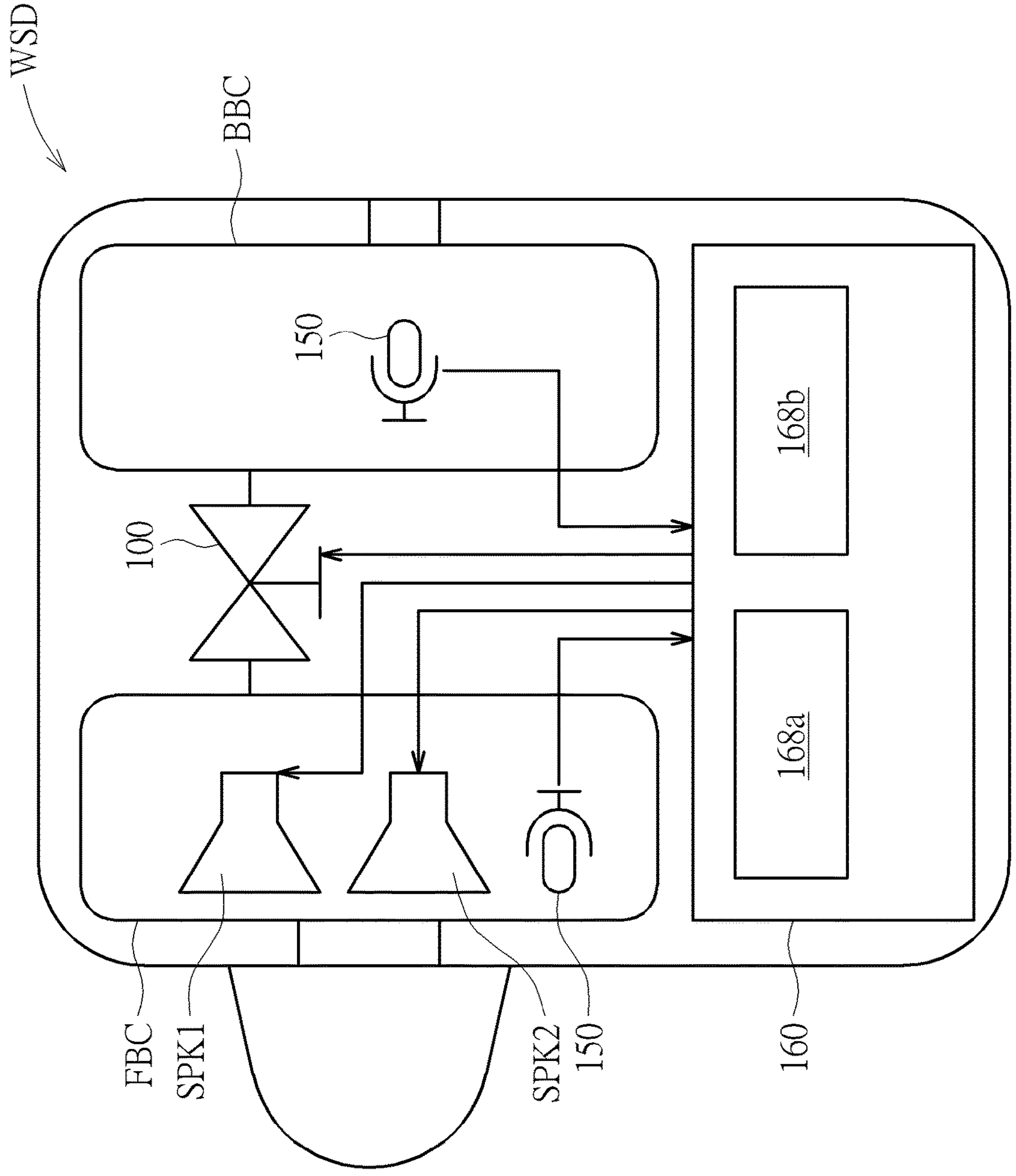
FIG. 8 is a schematic diagram illustrating a wearable sound device with the venting device according to an embodiment of the present invention.

Referring to FIG. 8, FIG. 8 is a schematic diagram illustrating a wearable sound device with the venting device according to an embodiment of the present invention. The wearable sound device WSD shown in FIG. 8 may include a plurality of acoustic transducers (e.g., acoustic transducers SPK1 and SPK2) configured to perform the acoustic transformation. Namely, the acoustic wave is produced by the acoustic transducers SPK1 and SPK2, and the venting device 100 is configured to be actuated to open or close the vent 130T for suppressing the occlusion effect. As shown in FIG. 8, the acoustic wave produced by the acoustic transducers SPK1 and SPK2 may propagate from a front chamber FBC of the wearable sound device WSD to the ear canal of the wearable sound device user.

The frequency range of the acoustic wave produced by each acoustic transducer may be designed based on requirement(s). For instance, an embodiment of acoustic transducer may produce the acoustic wave with the frequency range covering the human audible frequency range (e.g., from 20 Hz to 20 kHz), but not limited thereto. For instance, another embodiment of acoustic transducer may produce the acoustic wave with the frequency higher than a specific frequency, such that this acoustic transducer may be a high frequency sound unit (tweeter), but not limited thereto. For instance, another embodiment of acoustic transducer may produce the acoustic wave with the frequency lower than a specific frequency, such that this acoustic transducer may be a low frequency sound unit (woofer), but not limited thereto. Note that the specific frequency may be a value ranging from 800 Hz to 4 kHz (e.g., 1.44 kHz), but not limited thereto. The details of the high frequency sound unit and the low frequency sound unit may be referred to U.S. application Ser. No. 17/153,849 filed by Applicant, which is not narrated herein for brevity.

The acoustic transducers SPK1 and SPK2 may be the same or different. For example, the acoustic transducer SPK1 may be a high frequency sound unit (tweeter), and the acoustic transducer SPK2 may be a low frequency sound unit (woofer), but not limited thereto.

The front chamber FBC of the wearable sound device WSD shown in FIG. 8 may be connected to the first volume VL1 in the housing structure HSS where the venting device 100 is disposed (shown in FIG. 1). For example, the front chamber FBC of the wearable sound device WSD may be directly connected to the first volume VL1 in the housing structure HSS, or be connected to the first volume VL1 in the housing structure HSS through the ear canal of the wearable sound device user. Also, a back chamber BBC of the wearable sound device WSD shown in FIG. 8 may be connected to the second volume VL2 in the housing structure HSS where the venting device 100 is disposed (shown in FIG. 1). For example, the back chamber BBC of the wearable sound device WSD may be directly connected to the second volume VL2 in the housing structure HSS, or be connected to the second volume VL2 in the housing structure HSS through the ambient of the wearable sound device WSD.

The sensing devices 150, which may include acoustic sensor(s) (e.g., microphone(s)), may be disposed in the front chamber FBC and/or the back chamber BBC of the wearable sound device WSD, wherein the sensing devices 150 is configured to detect the occlusion event.

The venting device 100, the acoustic transducers SPK1 and SPK2 and the sensing devices 150 may be electrically connected to the controller 160. The controller 160 may apply acoustic driving signals on the acoustic transducers SPK1 and SPK2, such that the acoustic wave produced by the acoustic transducers SPK1 and SPK2 may be corresponding to the acoustic driving signals. The controller 160 may apply the driving signal based on the sensing result of the sensing device 150 on the venting device 100, so as to open or close the vent 130T for suppressing the occlusion effect. For example, the controller 160 may include a device controller 168*a* and a device driver 168*b*, but not limited thereto. For instance, the device controller 168*a* may determine the voltages applied on or to be applied on the actuating portions of the actuator 120 according to the sensing result generated by the sensing device 150, but not limited thereto.

The venting device of the present invention is not limited by the above embodiment(s). Other embodiments of the present invention are described below. For ease of comparison, same components will be labeled with the same symbol in the following. The following descriptions relate the differences between each of the embodiments, and repeated parts will not be redundantly described.

In the following embodiments, the venting device is designed for making the vent 130T be formed/opened under the condition of low power consumption. Note that the venting device is not limited to the following embodiments.

Figure 9:
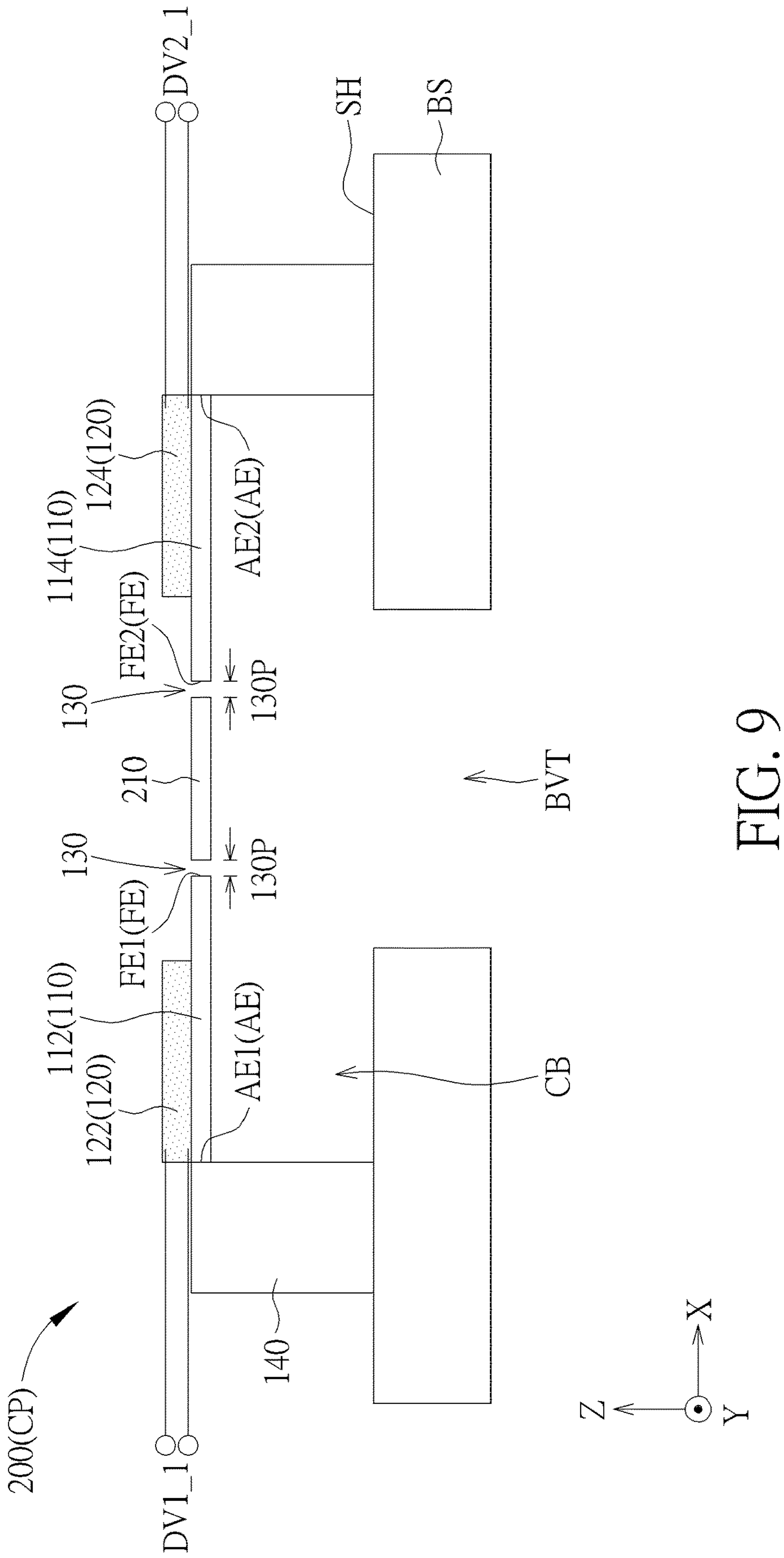
FIG. 9 and FIG. 10 are schematic diagrams of cross sectional views illustrating the film structure of the venting device in different mode according to a second embodiment of the present invention.
Figure 10:
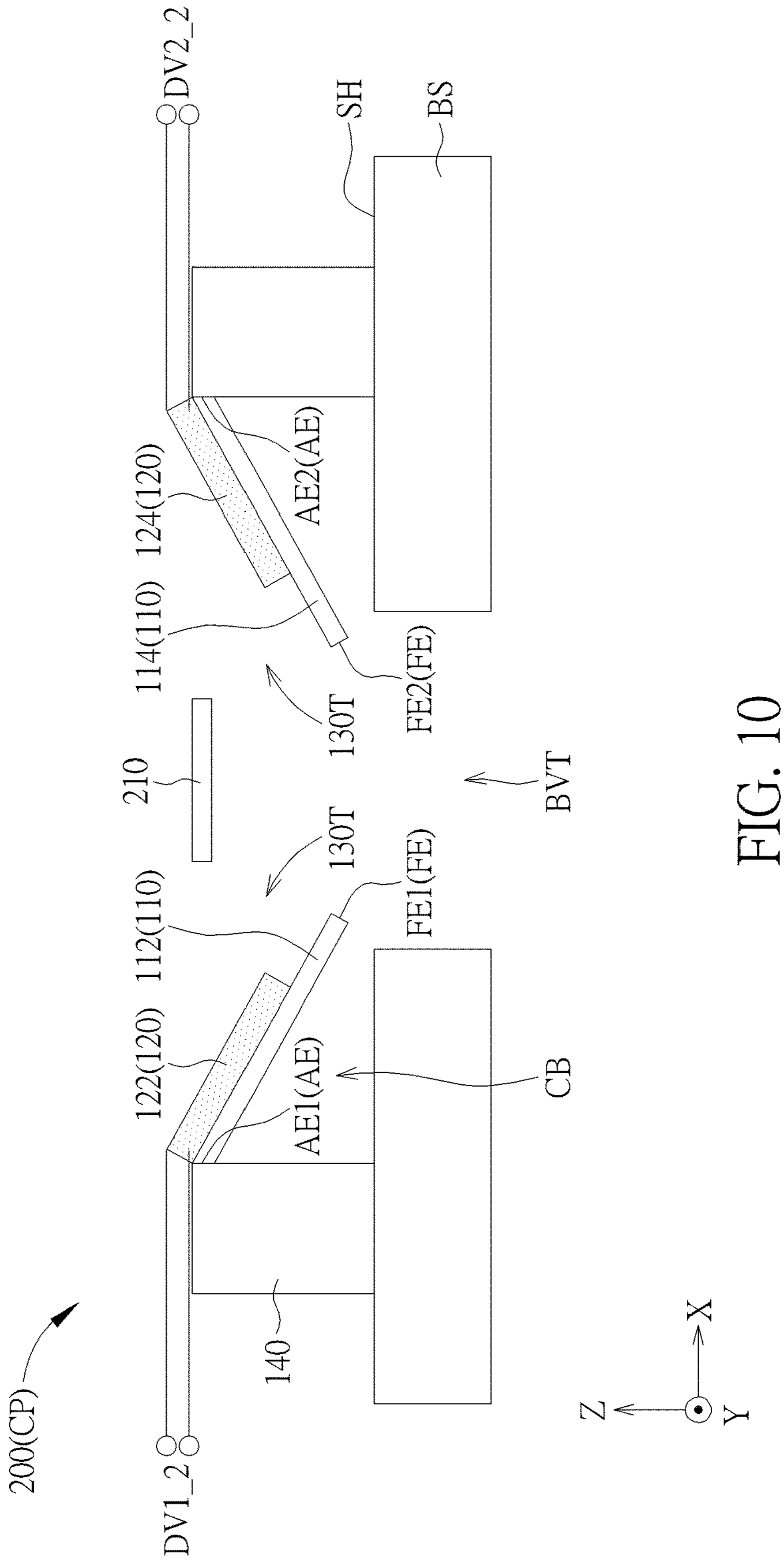

Referring to FIG. 9 and FIG. 10, FIG. 9 and FIG. 10 are schematic diagrams of cross sectional views illustrating the film structure of the venting device in different mode according to a second embodiment of the present invention, wherein the venting device 200 shown in FIG. 9 is in the first mode, and the venting device 200 shown in FIG. 10 is in the second mode. As shown in FIG. 9 and FIG. 10, the venting device 200 further includes a stationary structure 210 disposed on the base BS and adjacent to the film structure 110 (e.g., the chamber CB is also between the stationary structure 210 and the base BS). In FIG. 9 and FIG. 10, the stationary structure 210 may be disposed between the first flap 112 and the second flap 114 in the horizontal direction (e.g., the direction X). In FIG. 9 and FIG. 10, the stationary structure 210 may be immobilized in the operation of the venting device 200, such that the stationary structure 210 may not be actuated to move.

The stationary structure 210 may be designed based on requirement(s). For example, as shown in FIG. 9 and FIG. 10, the stationary structure 210 may be parallel to the base BS (e.g., the top surface SH of the base BS), but not limited thereto. As shown in FIG. 9 and FIG. 10, the slits 130 may be formed between the first flap 112 and the second flap 114, between the first flap 112 and the stationary structure 210, and/or between the second flap 114 and the stationary structure 210.

In some embodiments, in the top view, the stationary structure 210 may be corresponding to the whole first free end FE1 (i.e., the first free edge) of the first flap 112 and the whole second free end FE2 (i.e., the second free edge) of the second flap 114 in the horizontal direction (e.g., the direction X). One of the slits 130 is formed between the first flap 112 and the stationary structure 210 (i.e., two opposite sidewalls of this slit 130 respectively belong to the first flap 112 and the stationary structure 210), and another one of the slits 130 is formed between the second flap 114 and the stationary structure 210 (i.e., two opposite sidewalls of this slit 130 respectively belong to the second flap 114 and the stationary structure 210). Therefore, in the horizontal direction (e.g., the direction X), a distance between the first free end FE1 of the first flap 112 and the second free end FE2 of the second flap 114 in the venting device 200 of this case (FIG. 9 and FIG. 10) is greater than a distance between the first free end FE1 of the first flap 112 and the second free end FE2 of the second flap 114 in the venting device 100 of the first embodiment (FIG. 1 to FIG. 5). As shown in FIG. 9, when the venting device 200 is in the first mode, one of the gaps 130P exists between the first free end FE1 of the first flap 112 and the stationary structure 210, and another one of the gaps 130P exists between the second free end FE2 of the second flap 114 and the stationary structure 210 (i.e. the gaps 130P are formed because of the slits 130). As shown in FIG. 10, when the venting device 200 is in the second mode, one of the vents 130T is formed between the first free end FE1 of the first flap 112 and the stationary structure 210, and another one of the vents 130T is formed between the second free end FE2 of the second flap 114 and the stationary structure 210 (i.e. the vents 130T are formed because of the slits 130).

In some embodiments, in the top view, the stationary structure 210 may be corresponding to a corresponding part of the first free end FE1 (i.e., first free edge) and not corresponding to a non-corresponding part of the first free end FE1 (i.e., first free edge) in the horizontal direction (e.g., the direction X), and the stationary structure 210 may be corresponding to a corresponding part of the second free end FE2 (i.e., second free edge) and not corresponding to a non-corresponding part of the second free end FE2 (i.e., second free edge) in the horizontal direction (e.g., the direction X). The slits 130 may be formed between the first flap 112 and the second flap 114, between the first flap 112 and the stationary structure 210 and between the second flap 114 and the stationary structure 210 (i.e., a portion sidewall of the slit 130 belongs to the stationary structure 210). Therefore, in the horizontal direction (e.g., the direction X), a distance between the corresponding part of the first free end FE1 of the first flap 112 and the corresponding part of the second free end FE2 of the second flap 114 in the venting device 200 of this case (FIG. 9 and FIG. 10) is greater than a distance between the first free end FE1 of the first flap 112 and the second free end FE2 of the second flap 114 in the venting device 100 of the first embodiment (FIG. 1 to FIG. 5). In this case, in the horizontal direction (e.g., the direction X), a distance between the corresponding part of the first free end FE1 of the first flap 112 and the corresponding part of the second free end FE2 of the second flap 114 is greater than a distance between the non-corresponding part of the first free end FE1 of the first flap 112 and the non-corresponding part of the second free end FE2 of the second flap 114. In this case, when the venting device 200 is in the first mode, the gaps 130P may exist between the corresponding part of the first free end FE1 and the stationary structure 210, between the corresponding part of the second free end FE2 and the stationary structure 210 and between the non-corresponding part of the first free end FE1 and the non-corresponding part of the second free end FE2 (i.e. the gaps 130P are formed because of the slits 130). In this case, when the venting device 200 is in the second mode, the vents 130T may be formed between the corresponding part of the first free end FE1 and the stationary structure 210, between the corresponding part of the second free end FE2 and the stationary structure 210 and between the non-corresponding part of the first free end FE1 and the non-corresponding part of the second free end FE2 (i.e. the vents 130T are formed because of the slits 130).

As shown in FIG. 9, the venting device 200 is controlled by the controller 160 to close/seal the vent 130T (i.e., the venting device 200 is in the first mode) when the controller 160 determines to close the vent 130T. Thus, in FIG. 9, the driving signal DV1_1 and the driving signal DV2_1 are respectively applied on the first actuating portion 122 and the second actuating portion 124, so as to make the first flap 112 and the second flap 114 move to the first position or are maintained as the first position, thereby closing/sealing the vent 130T. For instance, the driving signal DV1_1 and the driving signal DV2_1 may be 15V, but not limited thereto. For instance, the power consumed by the venting device 200 in the first mode may be 0.16 mW, but not limited thereto.

As shown in FIG. 10, the venting device 200 is controlled by the controller 160 to form the vent 130T (i.e., the venting device 200 is in the second mode) when the controller 160 does not determine to close the vent 130T (e.g., the controller 160 determines to form the vent 130T). Thus, in FIG. 10, the driving signal DV1_2 and the driving signal DV2_2 are respectively applied on the first actuating portion 122 and the second actuating portion 124, so as to control the first flap 112 and the second flap 114 to form the vent 130T.

As shown in FIG. 10, when the controller 160 does not determine to close the vent 130T (e.g., the controller 160 determines to form the vent 130T), the venting device 200 is in the second mode, and the first flap 112 and the second flap 114 (i.e., the film structure 110) bend and hang downwards and are below the flat position, such that the vent 130T is formed. In some embodiments, in the second mode, the driving signal DV1_2 and the driving signal DV2_2 may be 0V or ground voltage, but not limited thereto. In some embodiments, in the second mode, the first actuating portion 122 and the second actuating portion 124 (i.e., the actuator 120) may be floating, but not limited thereto. In some embodiments, no voltage may be applied on the first actuating portion 122 and the second actuating portion 124 (i.e., the actuator 120), but not limited thereto. For instance, the power consumed by the venting device 200 in the second mode may be 0.3 μW, but not limited thereto.

In the second mode, since the stationary structure 210 exists between the first flap 112 and the second flap 114, the distance between the first free end FE1 of the first flap 112 and the second free end FE2 of the second flap 114 is enlarged, such that the vents 130T are formed when the first flap 112 and the second flap 114 hang downwards and are below the flat position.

According to the driving signals in these modes, the venting device 200 has the lowest power consumption in the second mode. In some embodiments, no voltage is applied on the actuator 120 (i.e., the driving signal applied on the actuator 120 is 0V or ground voltage, or the actuator 120 is floating) in the second mode. Therefore, in order to decrease the power consumption of the venting device 200, the venting device 200 may be in the second mode normally (i.e., the vent 130T is formed), and the venting device 200 may be changed to the first mode if necessary (e.g., the venting device 200 may be changed to the first mode for the acoustic transformation with high performance), but not limited thereto.

Figure 11:
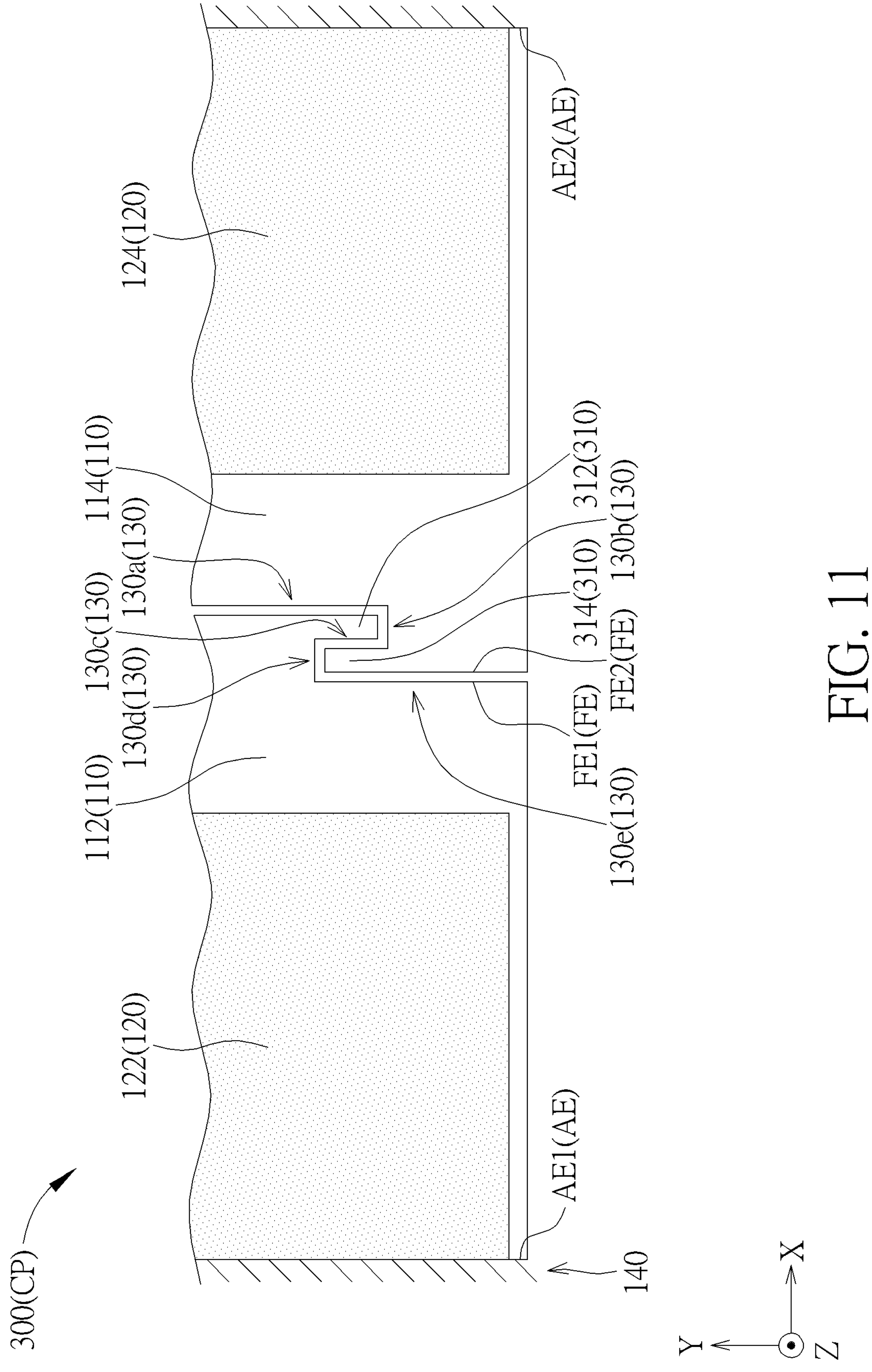
FIG. 11 is a schematic diagram of a top view illustrating a portion of the film structure of the venting device according to a third embodiment of the present invention.
Figure 12:
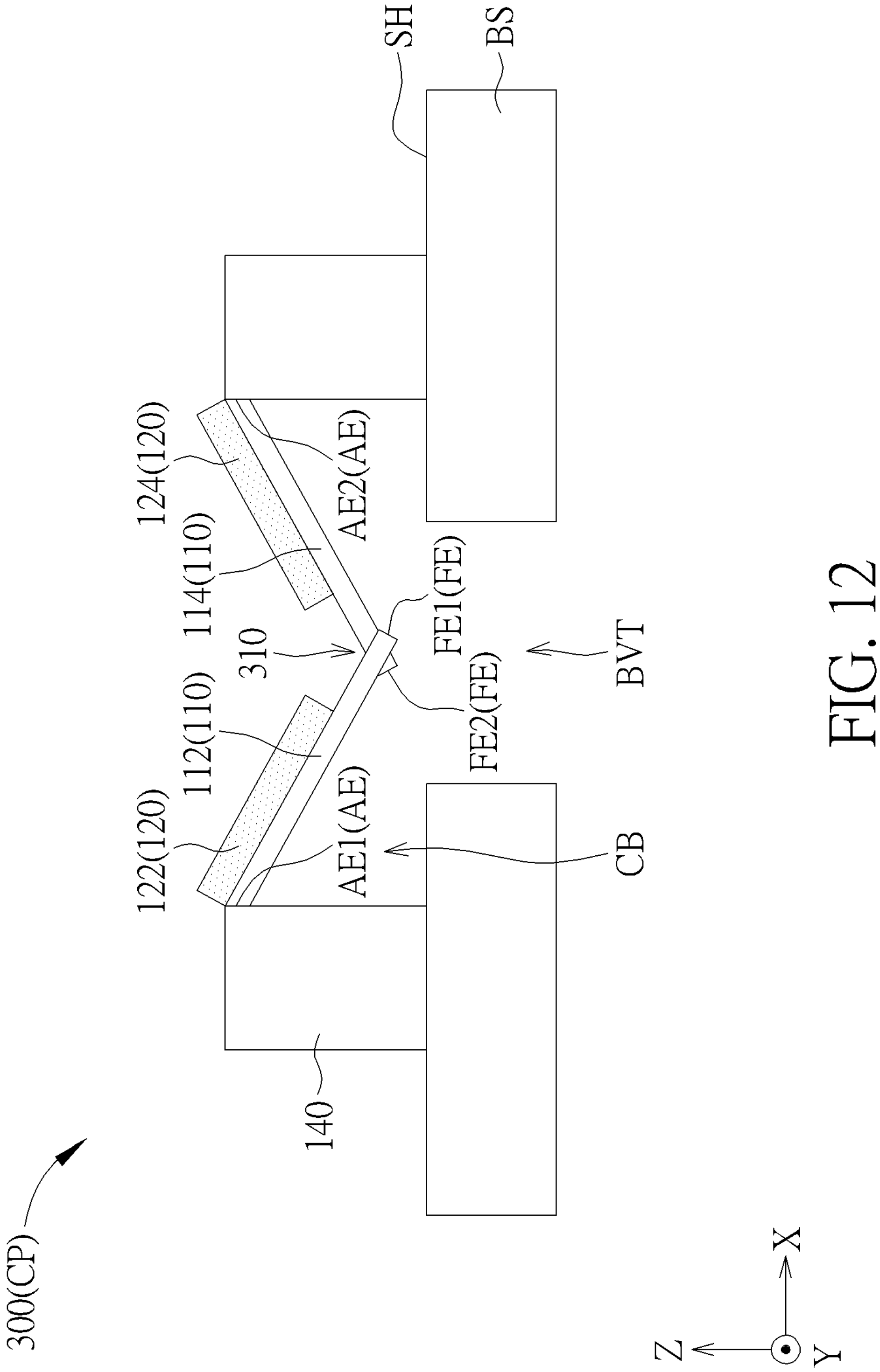
FIG. 12 is a schematic diagram of a cross sectional view illustrating the film structure of the venting device according to the third embodiment of the present invention.

Referring to FIG. 11 and FIG. 12, FIG. 11 is a schematic diagram of a top view illustrating a portion of the film structure of the venting device according to a third embodiment of the present invention, and FIG. 12 is a schematic diagram of a cross sectional view illustrating the film structure of the venting device according to the third embodiment of the present invention, wherein the venting device 300 shown in FIG. 12 is in the second mode. As shown in FIG. 11 and FIG. 12, in the condition that the film structure 110 bends and hangs downwards and are below the flat position to form the vent(s) 130T (i.e., the venting device 300 is in the second mode), the film structure 110 may further include a clamp structure 310 configured to constrain a deformation of the film structure 110 when the controller 160 determines to form the vent 130T (i.e., the controller 160 determines to make the venting device 300 in the second mode). For example, in FIG. 12, under the condition that the first flap 112 and the second flap 114 bend and hang downwards and are below the flat position, the clamp structure 310 may lock the first flap 112 and the second flap 114 when a moving distance of the first flap 112 (e.g., the first free end FE1) along the direction Z and a moving distance of the second flap 114 (e.g., the second free end FE2) along the direction Z are greater than a distance threshold value.

In this embodiment, the clamp structure 310 and the stationary structure 210 may be included in the venting device 300, and the clamp structure 310 and the stationary structure 210 may be respectively corresponding to different parts (e.g., the corresponding part and the non-corresponding part described above) of the first free end FE1 and respectively corresponding to different parts (e.g., the corresponding part and the non-corresponding part described above) of the second free end FE2 in the horizontal direction (e.g., the direction X). Therefore, if the cross-sectional line of the cross sectional view extends along the direction X, the clamp structure 310 and the stationary structure 210 would be shown in different cross sectional views. For instance, FIG. 10 shows a first portion of the venting device 300 in the second mode, and FIG. 12 shows a second portion of the venting device 300 in the second mode, wherein the first portion shown in FIG. 10 contains the stationary structure 210, the first flap 112 and the second flap 114, and the second portion shown in FIG. 12 contains the clamp structure 310, the first flap 112 and the second flap 114.

The clamp structure 310 may have any suitable design based on requirement(s). As shown in FIG. 11, the clamp structure 310 may be formed because of the slit(s) 130. For example, in FIG. 11, the slit 130 may include a first slit segment 130*a*, a second slit segment 130*b*, a third slit segment 130*c*, a fourth slit segment 130*d* and a fifth slit segment 130*e* connected to each other in sequence, wherein the first slit segment 130*a*, the third slit segment 130*c* and the fifth slit segment 130*e* may be parallel to one horizontal direction (e.g., direction Y), the second slit segment 130*b* and the fourth slit segment 130*d* may be parallel to another horizontal direction (e.g., direction X).

In FIG. 11, the clamp structure 310 may include a first clamp component 312 and a second clamp component 314, the first clamp component 312 may be a portion of the first flap 112 (equivalently, the first clamp component 312 may belong to the first flap 112), and the second clamp component 314 may be a portion of the second flap 114 (equivalently, the second clamp component 314 may belong to the second flap 114). In FIG. 11, the first clamp component 312 may be disposed between the second clamp component 314 of the second flap 114 and another portion of the second flap 114, and the second clamp component 314 may be disposed between the first clamp component 312 of the first flap 112 and another portion of the first flap 112. For example, in FIG. 11, a length direction of the first clamp component 312 and a length direction of the second clamp component 314 may be substantially parallel to the direction Y, but not limited thereto. For example, the clamp structure 310 may be a latch structure, but not limited thereto.

As shown in FIG. 11 and FIG. 12, when the first flap 112 (e.g., the first free end FE1) and the second flap 114 (e.g., the second free end FE2) move along the direction Z with a displacement greater than the distance threshold value, the first clamp component 312 and the second clamp component 314 are buckled to each other, so as to lock the first flap 112 and the second flap 114 for constraining their deformations. Note that the width of the slit 130 and the size of the clamp component are related to the buckled effect of the clamp structure 310.

In this embodiment, even if the film structure 110 is constrained by the clamp structure 310, the vent 130T is still formed (e.g., the vent 130T is formed between the flap and the stationary structure 210, as shown in FIG. 10) when the venting device 300 is in the second mode. Note that the design of the clamp structure 310 is related to the size of the vent 130T.

Because of the existence of the clamp structure 310, the opening sizes of the vents 130T of different venting devices 300 may be substantially the same.

Figure 13:
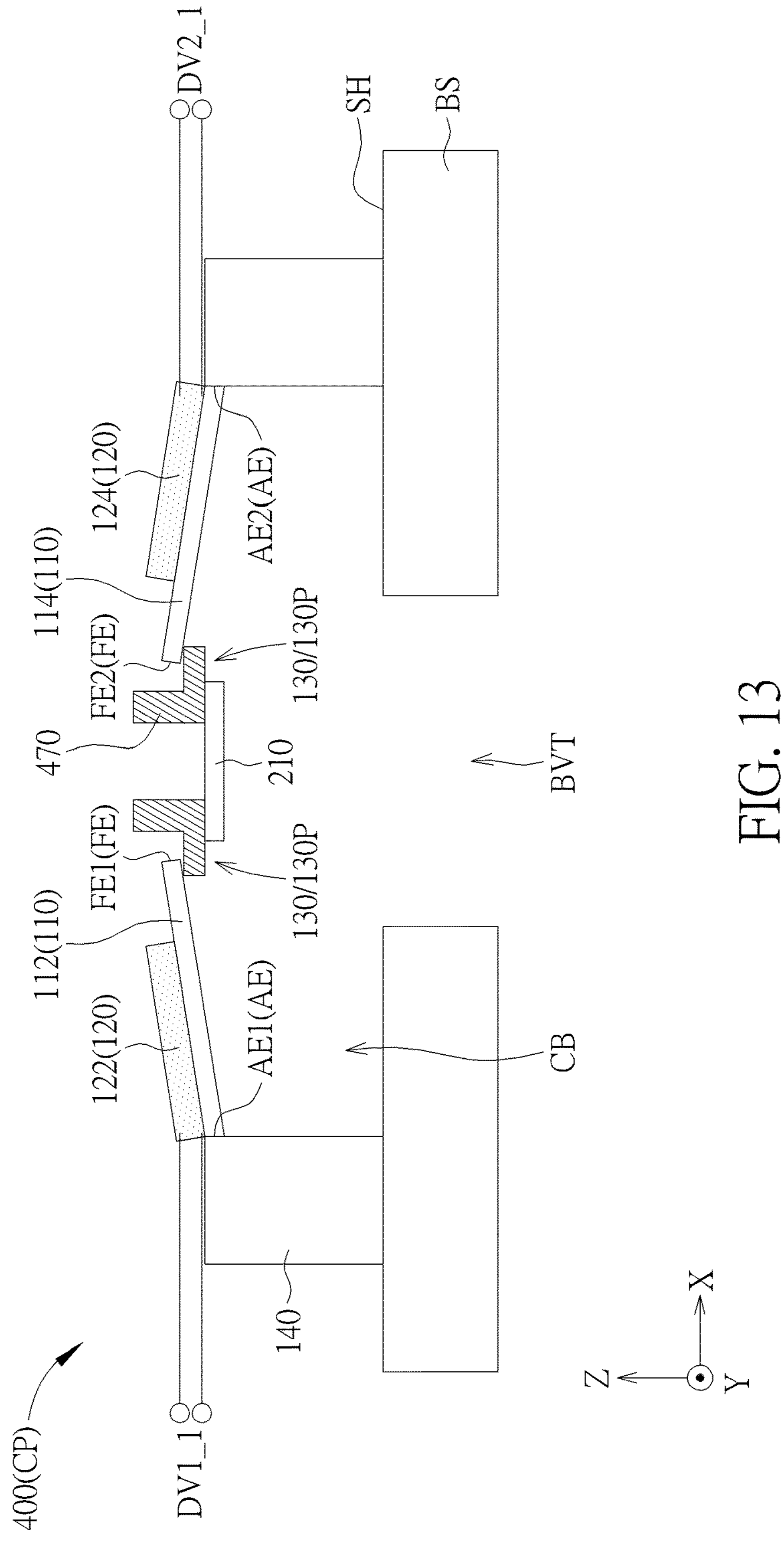
FIG. 13 is a schematic diagram of a cross sectional view illustrating the film structure of the venting device according to a fourth embodiment of the present invention.

Referring to FIG. 13, FIG. 13 is a schematic diagram of a cross sectional view illustrating the film structure of the venting device according to a fourth embodiment of the present invention, wherein the venting device 400 shown in FIG. 13 is in the first mode. Compared with the venting device 200 shown in FIG. 9 and FIG. 10, the venting device 400 shown in FIG. 13 further includes a clamp 470 configured to hold the film structure 110 at the first position when the controller 160 determines to close the vent 130T (i.e., the controller 160 determines to make the venting device 400 in the first mode). Thus, the clamp 470 may prevent the free end FE of the film structure 110 (the flap) from moving downwards or upwards.

The clamp 470 may have any suitable design based on requirement(s), and the clamp 470 may be actuated to move by any suitable method. In some embodiments, the actuation of the clamp 470 may be controlled by the electrical signal(s). For example, the movement of the clamp 470 may be caused by a thermal actuation, an electrostatic actuation, a magnetic actuation, a piezoelectric actuation or other suitable actuation. In some embodiments, the clamp 470 would receive the electrical signal to make the clamp 470 move, and the clamp 470 would not receive the electrical signal to make the clamp 470 stop moving, but not limited thereto.

As shown in FIG. 13, the clamp 470 may be disposed laterally by the film structure 110 in the top view perspective, and the clamp 470 may be actuated to move for holding the film structure 110 or release the film structure 110. For example, in FIG. 13, the clamp 470 may be disposed on the stationary structure 210, and the clamp 470 may move horizontally when the clamp 470 is actuated, but not limited thereto. For example, in FIG. 13, the clamp 470 may move toward the free end FE of the film structure 110 in the horizontal direction (e.g., the direction X) to hold the film structure 110, and the clamp 470 may move away from the free end FE of the film structure 110 in the horizontal direction (e.g., a direction opposite to the direction X) to release the film structure 110, but not limited thereto. In FIG. 13, when the clamp 470 holds the film structure 110, the clamp 470 prevents the film structure 110 from moving downwards.

In transition from the first mode to the second mode, the free end FE of the film structure 110 (e.g., the first free end FE1 of the first flap 112 and the second free end FE2 of the second flap 114) may move upwards to be above the first position by applying a mode-changing driving signal on the actuator 120 (e.g., the first actuating portion 122 and the second actuating portion 124), then, the clamp 470 may move away from the free end FE of the film structure 110, and finally, the free end FE of the film structure 110 (e.g., the first free end FE1 of the first flap 112 and the second free end FE2 of the second flap 114) may hang downwards to be below the first position and the flat position by applying the second mode driving signal (e.g., the driving signal DV1_2 and the driving signal DV2_2) on the actuator 120 (e.g., the first actuating portion 122 and the second actuating portion 124).

Conversely, in transition from the second mode back to the first mode, the free end FE of the film structure 110 (e.g., the first free end FE1 of the first flap 112 and the second free end FE2 of the second flap 114) may move upwards to be above the first position by applying the mode-changing driving signal on the actuator 120 (e.g., the first actuating portion 122 and the second actuating portion 124), then, the clamp 470 may move toward the free end FE of the film structure 110, and finally, the free end FE of the film structure 110 (e.g., the first free end FE1 of the first flap 112 and the second free end FE2 of the second flap 114) may move downwards to the first position by applying the first mode driving signal (e.g., the driving signal DV1_1 and the driving signal DV2_1) on the actuator 120 (e.g., the first actuating portion 122 and the second actuating portion 124), such that the clamp 470 may hold the film structure 110 at the first position.

In some embodiments, since the clamp 470 holds the film structure 110 at the first position, the first mode driving signal (e.g., the driving signal DV1_1 and the driving signal DV2_1) may be less than or equal to a driving signal corresponding the first position. For example, the first mode driving signal (e.g., the driving signal DV1_1 and the driving signal DV2_1) may be 0V or ground voltage, or the actuator 120 is floating in the first mode, so as to decrease the power consumption of the venting device 400 in the first mode (e.g., the power consumed by the venting device 400 in the first mode may be 0.3 μW), but not limited thereto. Namely, after the clamp 470 holds the film structure 110 at the first position, no voltage is applied to the actuator 120, and the vent 130T is closed (the venting device 400 is in the first mode).

In this case, the first mode driving signal (e.g., the driving signal DV1_1 and the driving signal DV2_1) and the second mode driving signal (e.g., the driving signal DV1_2 and the driving signal DV2_2) may be 0V or ground voltage, or the actuator 120 is floating in the first mode and the second mode, so as to decrease the power consumption of the venting device 400.

Moreover, in some embodiments, after the clamp 470 holds the film structure 110 at the first position, no voltage is applied to the clamp 470 and the vent 130T is closed, so as to decrease the power consumption of the venting device 400. In some embodiments, after the clamp 470 releases the film structure 110, no voltage is applied to the clamp 470, so as to decrease the power consumption of the venting device 400.

Figure 14:
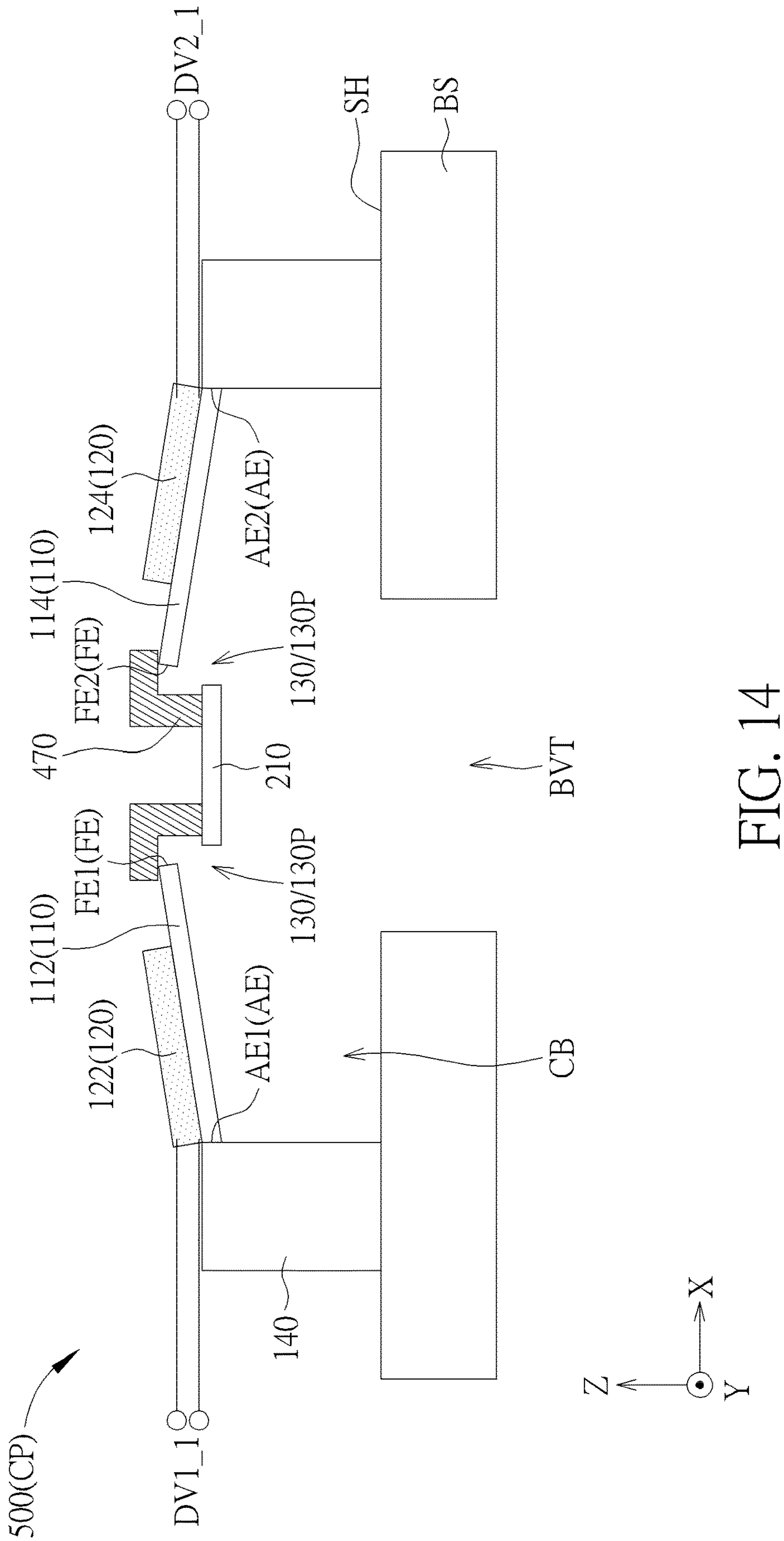
FIG. 14 is a schematic diagram of a cross sectional view illustrating the film structure of the venting device according to a fifth embodiment of the present invention.

Referring to FIG. 14, FIG. 14 is a schematic diagram of a cross sectional view illustrating the film structure of the venting device according to a fifth embodiment of the present invention, wherein the venting device 500 shown in FIG. 14 is in the first mode. Compared with the venting device 400 shown in FIG. 13, the design of the clamp 470 is different. In FIG. 14, when the clamp 470 holds the film structure 110, the clamp 470 prevents the film structure 110 from moving above the first position (e.g., this movement may be caused by the residual stress) in the first mode, so as to control the size of the gap 130P.

Figure 15:
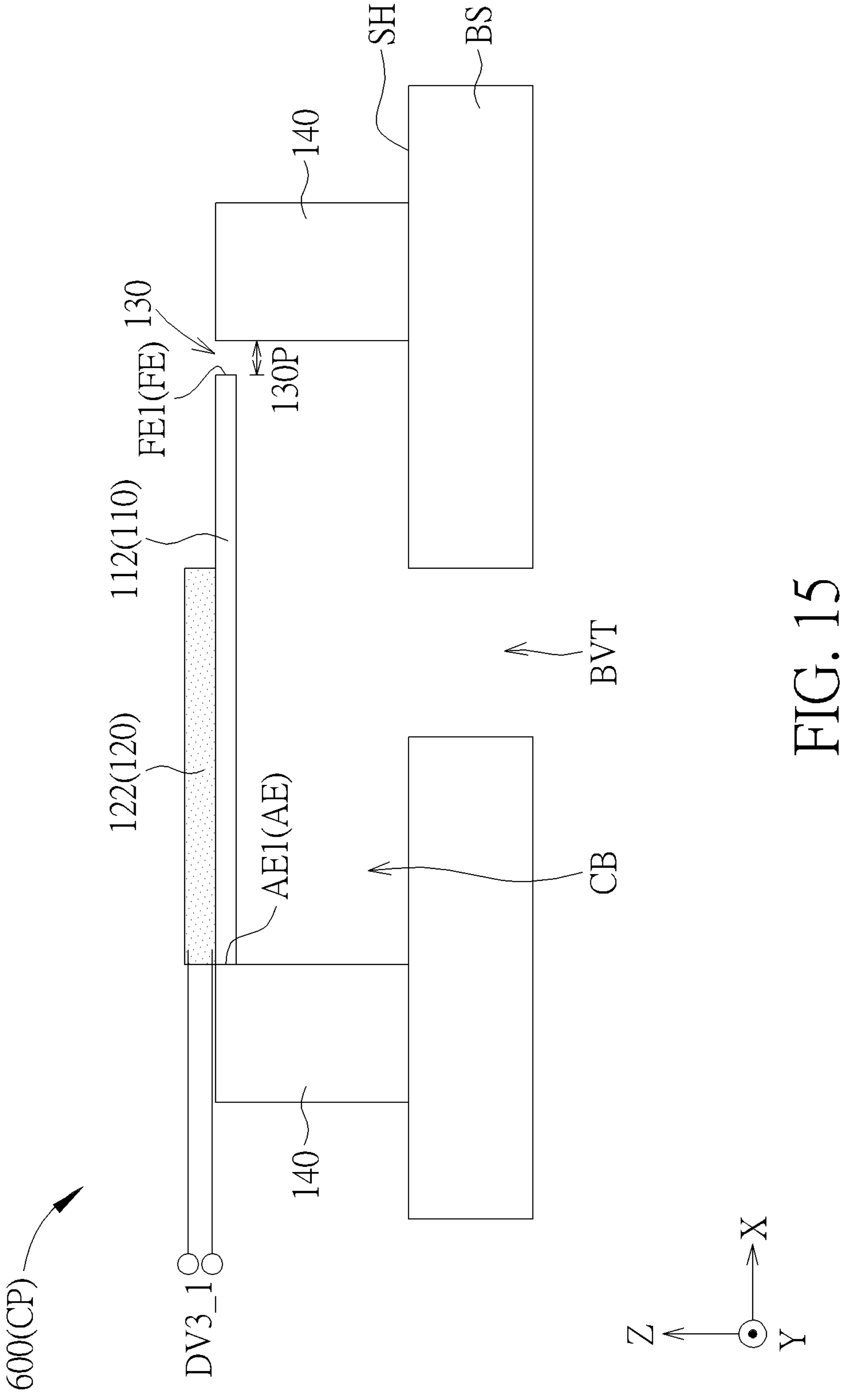
FIG. 15 to FIG. 17 are schematic diagrams of cross sectional views illustrating the film structure of the venting device according to a sixth embodiment of the present invention.
Figure 16:
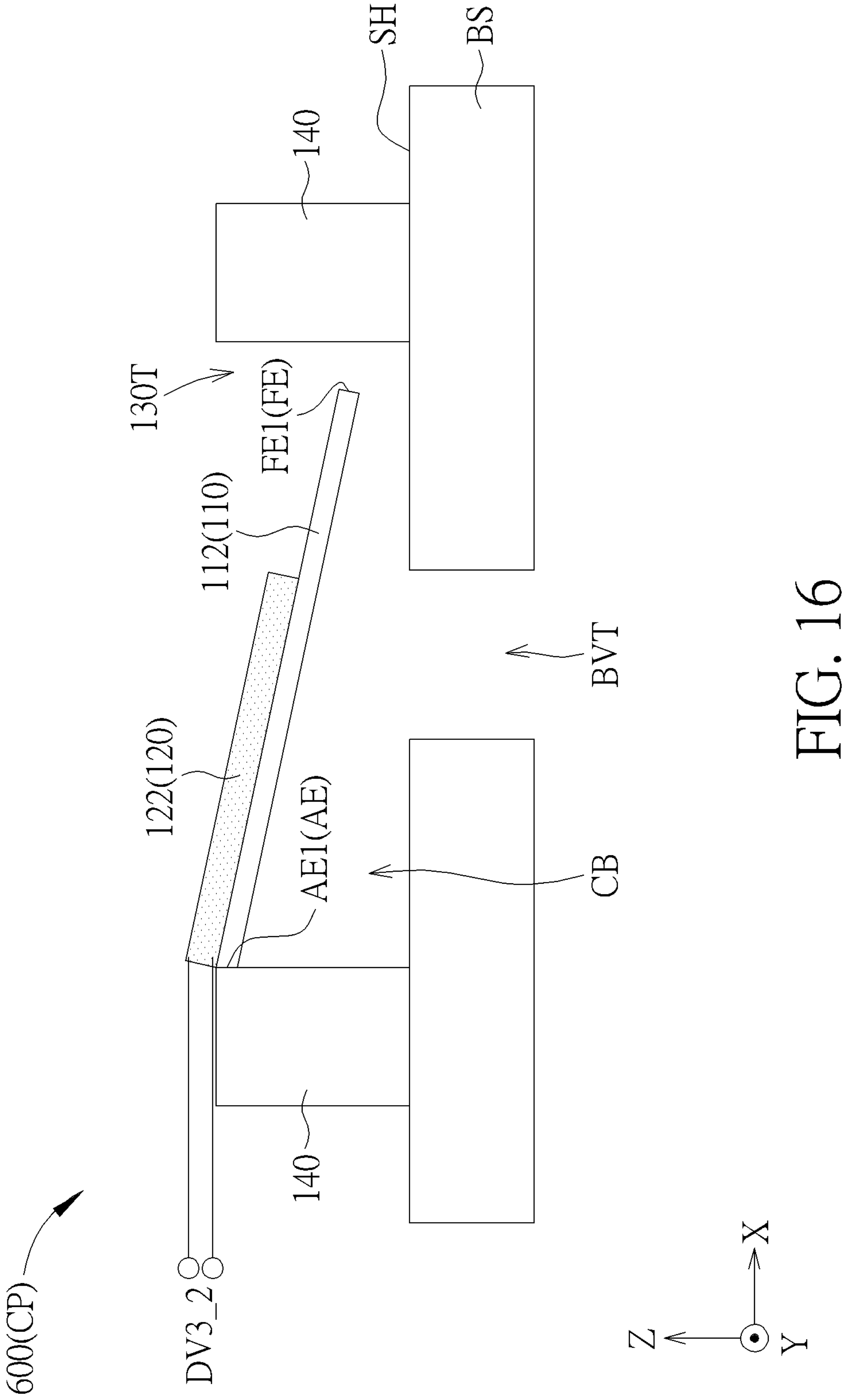
Figure 17:
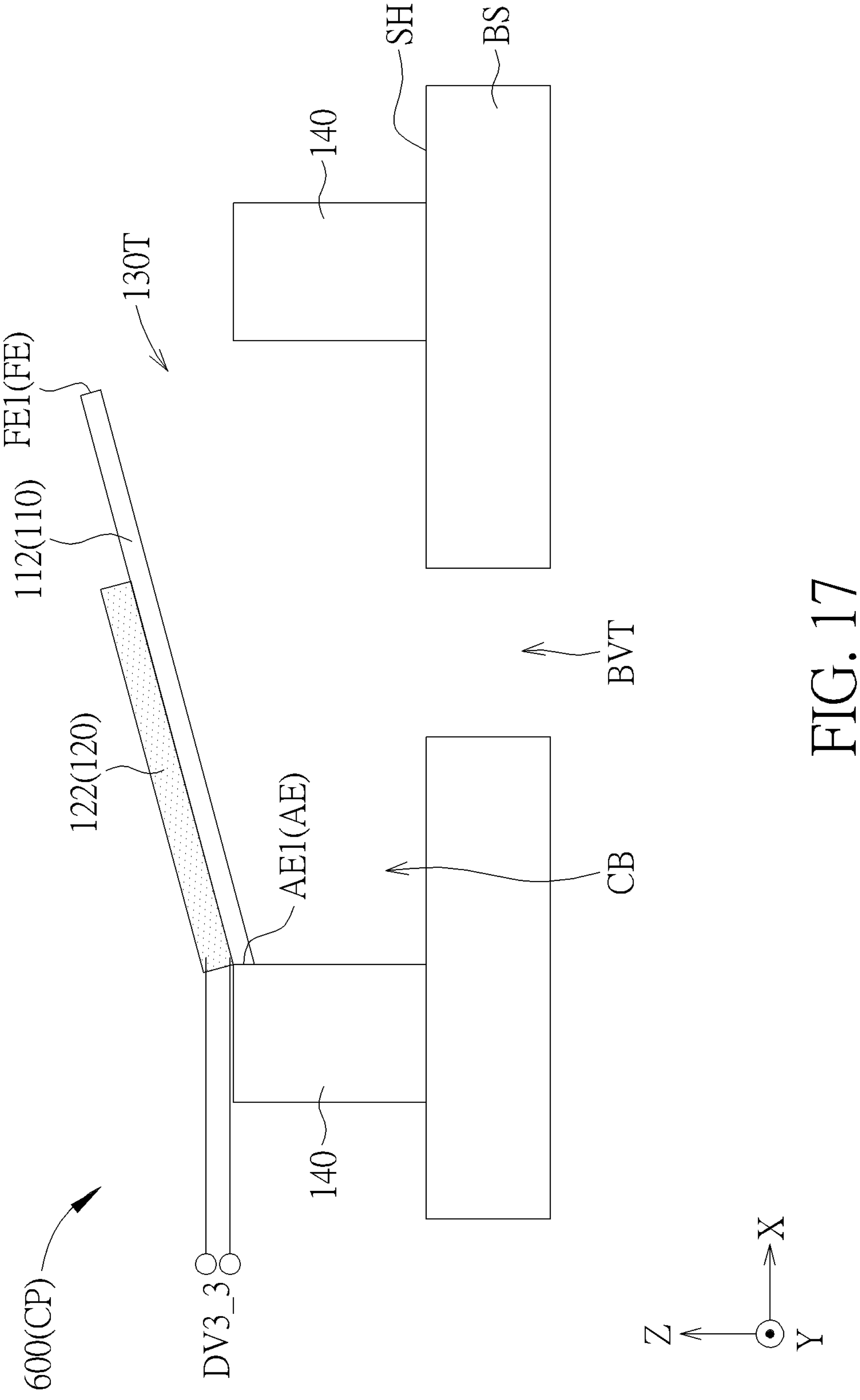

Referring to FIG. 15 to FIG. 17, FIG. 15 to FIG. 17 are schematic diagrams of cross sectional views illustrating the film structure of the venting device according to a sixth embodiment of the present invention, wherein FIG. 15 shows the first mode of the venting device 600, and FIG. 16 and FIG. 17 show the second mode of the venting device 600. Compared with the venting device 100 shown in FIG. 1 to FIG. 5, the film structure 110 of the venting device 600 shown in FIG. 15 to FIG. 17 has only one flap (i.e., the first flap 112), and the slit 130 is a boundary of the film structure 110. Namely, two opposite sidewalls of the slit 130 respectively belong to the first flap 112 and other component (e.g., the right anchor structure 140 shown in FIG. 15 to FIG. 17), such that one sidewall of the slit 130 is stationary/immobile during the operation of the venting device 600.

As shown in FIG. 15, in the first mode, the first actuating portion 122 disposed on the first flap 112 receives a driving signal DV3_1. The first flap 112 move to the first position or are maintained as the first position according to the driving signal DV3_1, so as to close the vent 130T. The driving signal DV3_1 may be designed based on requirement(s). In some embodiments, the driving signal DV3_1 may be a constant voltage with a third threshold value, but not limited thereto.

As shown in FIG. 16, in the second mode, the first actuating portion 122 disposed on the first flap 112 receives a driving signal DV3_2. According to the driving signal DV3_2, the first free end FE1 moves below the first position and the flat position, so as to form the vent 130T. The driving signal DV3_2 may be designed based on requirement(s). In some embodiments, the driving signal DV3_2 may be a constant voltage lower than the third threshold value. For example, the displacement of the first free end FE1 in the direction Z may be −18 μm compared to the first position (or the flat position) when the driving signal DV3_2 is 0V. Assuming the thickness of the film structure 110 is 5 μm, as an example, the vent 130T is "opened" with the opening size of 13 μm (18 μm-5 μm) when the driving signal DV3_2 is 0V.

As shown in FIG. 17, in the second mode with another type, the first actuating portion 122 disposed on the first flap 112 receives a driving signal DV3_3. According to the driving signal DV3_3, the first free end FE1 moves above the first position and the flat position, so as to form the vent 130T. The driving signal DV3_3 may be designed based on requirement(s). In some embodiments, the driving signal DV3_3 may be a constant voltage higher than the third threshold value.

Figure 18:
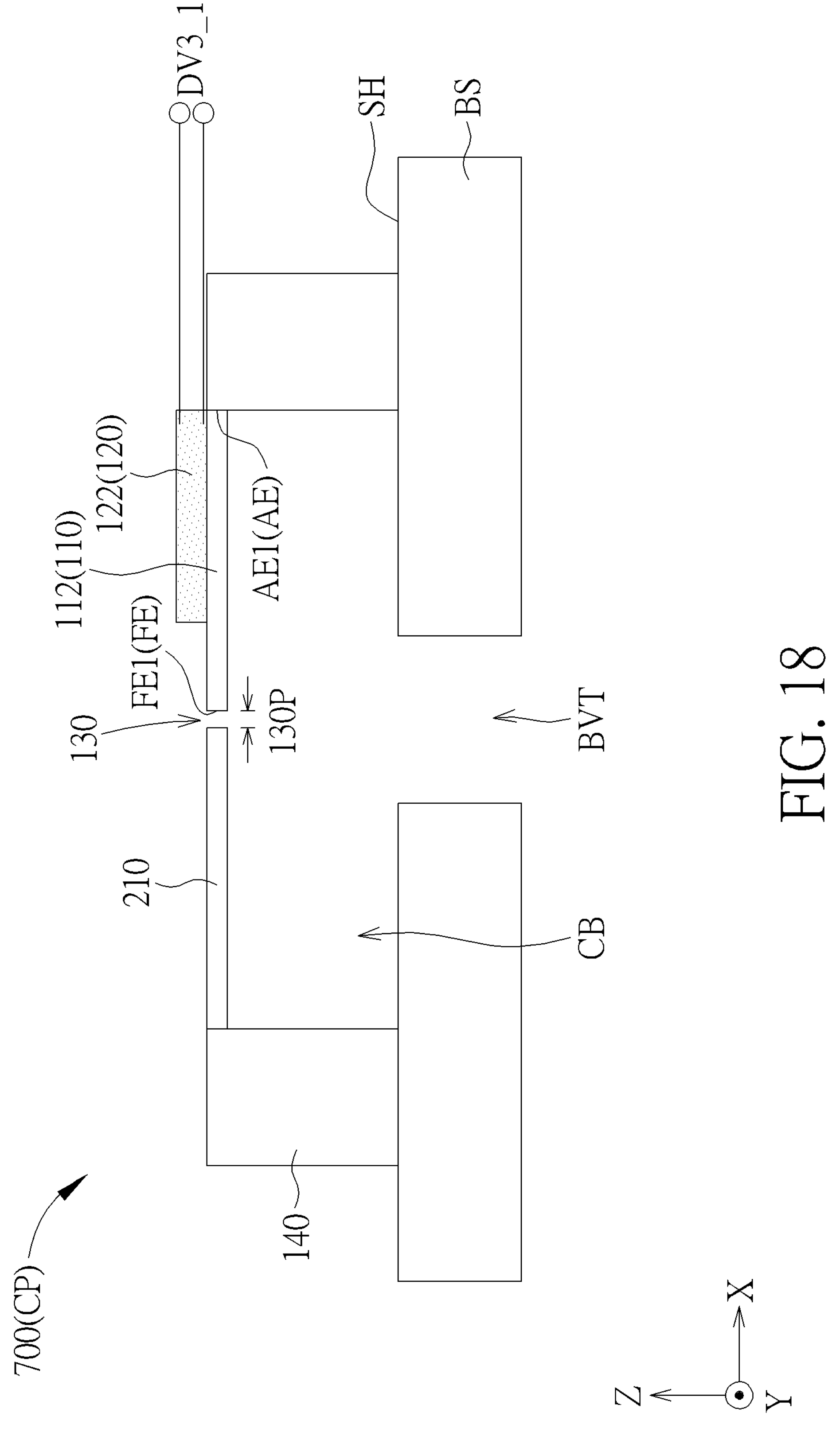
FIG. 18 and FIG. 19 are schematic diagrams of cross sectional views illustrating the film structure of the venting device in different mode according to a seventh embodiment of the present invention.
Figure 19:
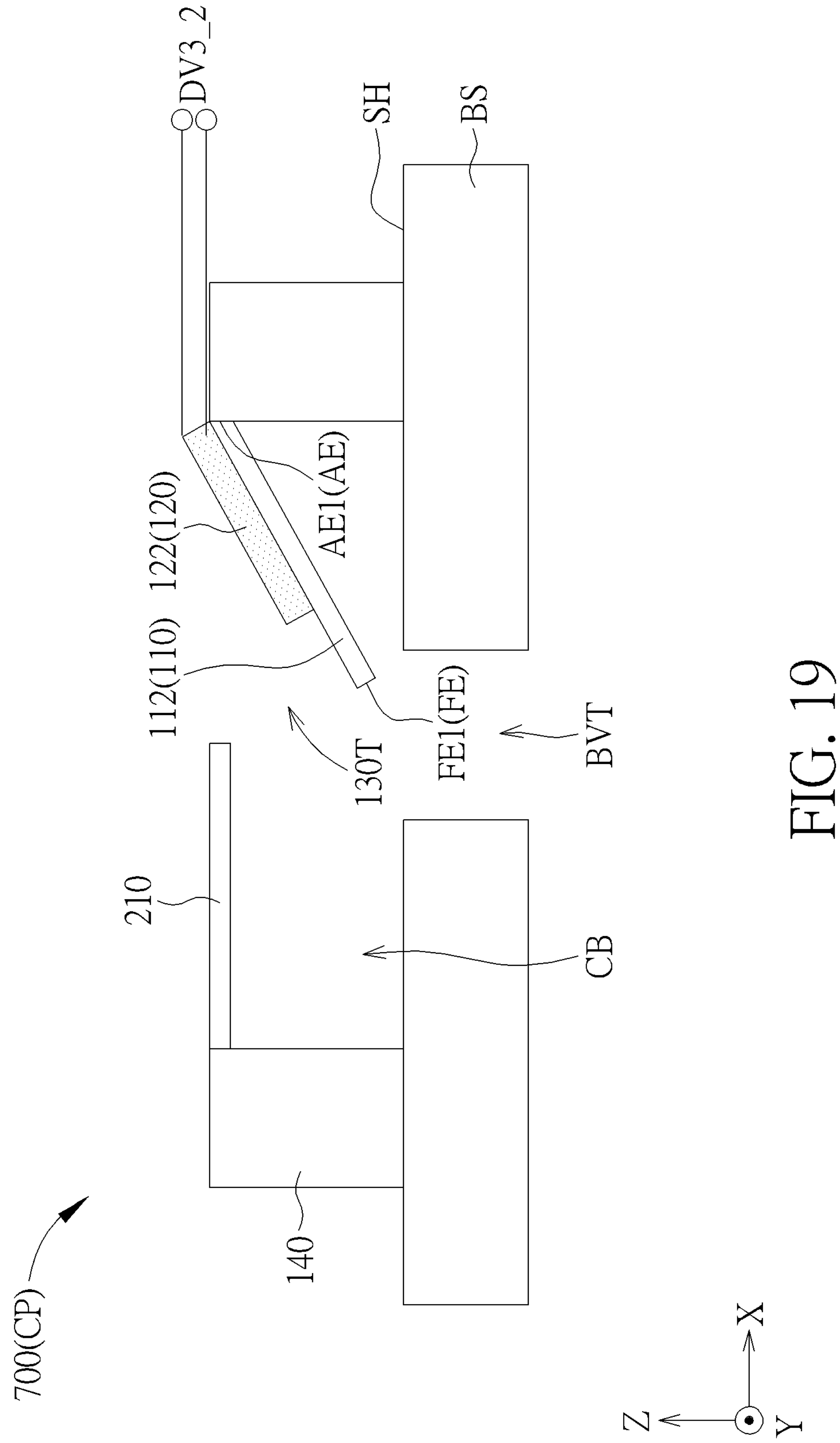

Referring to FIG. 18 and FIG. 19, FIG. 18 and FIG. 19 are schematic diagrams of cross sectional views illustrating the film structure of the venting device in different mode according to a seventh embodiment of the present invention, wherein FIG. 18 shows the first mode of the venting device 700, and FIG. 19 shows the second mode of the venting device 700. Compared with the venting device 600 shown in FIG. 15 to FIG. 17, the venting device 700 shown in FIG. 18 to FIG. 19 further includes a stationary structure 210 disposed on a side of the film structure 110 (i.e., the first flap 112) in the horizontal direction (e.g., the direction X) and adjacent to the film structure 110. In FIG. 18 and FIG. 19, the stationary structure 210 may be immobilized in the operation of the venting device 700, such that the stationary structure 210 may not be actuated to move.

The stationary structure 210 may be designed based on requirement(s). For example, as shown in FIG. 18 and FIG. 19, the stationary structure 210 may be parallel to the base BS (e.g., the top surface SH of the base BS), but not limited thereto. As shown in FIG. 18 and FIG. 19, the slit 130 may be formed between the first flap 112 and the stationary structure 210.

In some embodiments, in the top view, the stationary structure 210 may be corresponding to the whole first free end FE1 (i.e., first free edge) or a part of the first free end FE1 of the first flap 112 in the horizontal direction (e.g., the direction X). As shown in FIG. 18, when the venting device 700 is in the first mode, the gap 130P exists between the first free end FE1 of the first flap 112 and the stationary structure 210 (i.e. the gap 130P is formed because of the slit 130). As shown in FIG. 19, when the venting device 700 is in the second mode, the vent 130T is formed between the first free end FE1 of the first flap 112 and the stationary structure 210 (i.e. the vent 130T is formed because of the slit 130).

In the second mode (as shown in FIG. 19), because of the existence of the stationary structure 210, the distance between the first free end FE1 of the first flap 112 and the left anchor structure 140 is enlarged. Therefore, the effect of the vent 130T may be enhanced, thereby increasing the effect of suppressing the occlusion effect.

Figure 20:
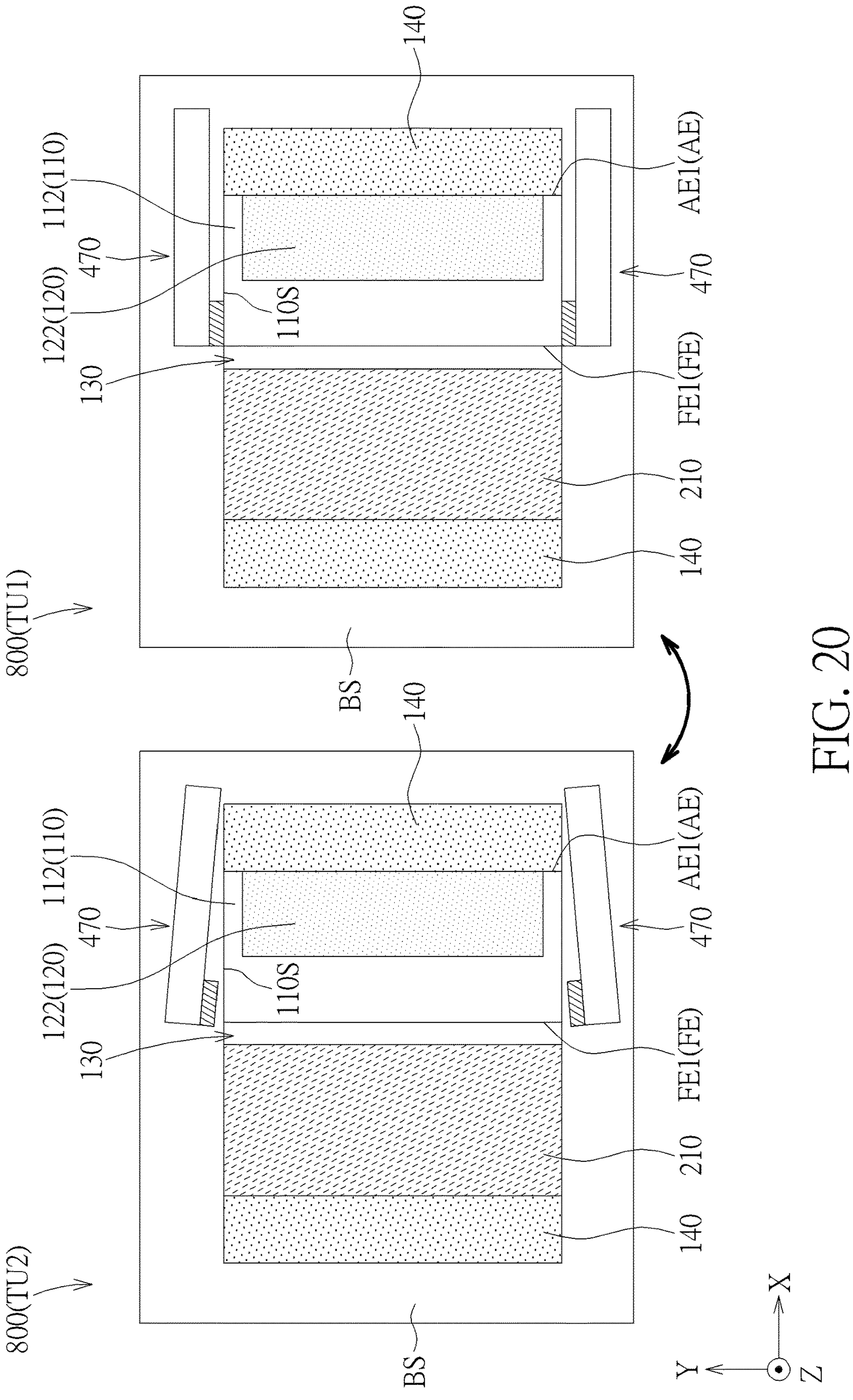
FIG. 20 is a schematic diagram of a top view illustrating the venting device according to an eighth embodiment of the present invention.

Referring to FIG. 20, FIG. 20 is a schematic diagram of a top view illustrating the venting device according to an eighth embodiment of the present invention, wherein FIG. 20 shows the first mode of the venting device 800. Compared with the venting device 700 shown in FIG. 18 to FIG. 19, the venting device 800 shown in FIG. 20 further includes a clamp 470 configured to hold the film structure 110 at the first position when the controller 160 determines to close the vent 130T (i.e., the controller 160 determines to make the venting device 800 in the first mode). Thus, as shown in FIG. 20, the clamp 470 may prevent the free end FE of the film structure 110 (the first free end FE1 of the first flap 112) from moving downwards or upwards. The detail design of the clamp 470 can be referred to above, and repeated parts will not be redundantly described.

As shown in FIG. 20, the clamp 470 may be disposed laterally by the film structure 110 in the top view perspective, and the clamp 470 may be actuated to move for holding the film structure 110 or release the film structure 110. For example, in FIG. 20, the clamp 470 may be disposed on the base BS and adjacent to a side edge 110S of the first flap 112 (i.e., a side edge of the film structure 110), wherein the side edge 110S may be directly connected to the first free end FE1 (i.e., the first free edge), but not limited thereto. For example, in FIG. 20, the clamp 470 may move horizontally when the clamp 470 is actuated, but not limited thereto. For example, in FIG. 20, the clamp 470 may move toward the side edge 110S of the first flap 112 in the horizontal direction (e.g., the direction Y) to hold the first flap 112, and the clamp 470 may move away from the side edge 110S of the first flap 112 in the horizontal direction (e.g., a direction opposite to the direction Y) to release the first flap 112, but not limited thereto. In FIG. 20, the venting device 800 may have two clamps 470 to catch the first flap 112 at two opposite side edges 110S, so as to prevent the first flap 112 from moving downwards and upwards.

In transition from the first mode to the second mode, the clamps 470 move away from the side edges 110S of the film structure 110 (i.e., the first flap 112) to release the film structure 110 (in FIG. 20, the venting device 800 is change from the status TU1 to the status TU2), and then, the free end FE of the film structure 110 (e.g., the first free end FE1 of the first flap 112) move and hang downwards to be below the first position and the flat position by applying the second mode driving signal (e.g., the driving signal DV3_2) on the actuator 120 (e.g., the first actuating portion 122).

Conversely, in transition from the second mode back to the first mode, the free end FE of the film structure 110 (e.g., the first free end FE1 of the first flap 112) moves upwards to the first position by applying the mode-changing driving signal on the actuator 120 (e.g., the first actuating portion 122), and then, the clamps 470 move toward the side edges 110S of the film structure 110 to hold the film structure 110 at the first position (in FIG. 20, the venting device 800 is change from the status TU2 to the status TU1).

In some embodiments, since the clamps 470 hold the film structure 110 at the first position, the first mode driving signal (e.g., the driving signal DV3_1) may be less than or equal to a driving signal corresponding the first position. For example, the first mode driving signal (e.g., the driving signal DV3_1) may be 0V or ground voltage, or the actuator 120 is floating in the first mode, so as to decrease the power consumption of the venting device 800 in the first mode (e.g., the power consumed by the venting device 800 in the first mode may be 0.3 μW), but not limited thereto. Namely, after the clamps 470 hold the film structure 110 at the first position, no voltage is applied to the actuator 120, and the vent 130T is closed (the venting device 800 is in the first mode).

In this case, the first mode driving signal (e.g., the driving signal DV3_1) and the second mode driving signal (e.g., the driving signal DV3_2) may be 0V or ground voltage, or the actuator 120 is floating in the first mode and the second mode, so as to decrease the power consumption of the venting device 800.

Moreover, in some embodiments, after the clamp 470 holds the film structure 110 at the first position, no voltage is applied to the clamp 470 and the vent 130T is closed, so as to decrease the power consumption of the venting device 800. In some embodiments, after the clamp 470 releases the film structure 110, no voltage is applied to the clamp 470, so as to decrease the power consumption of the venting device 800.

Figure 21:
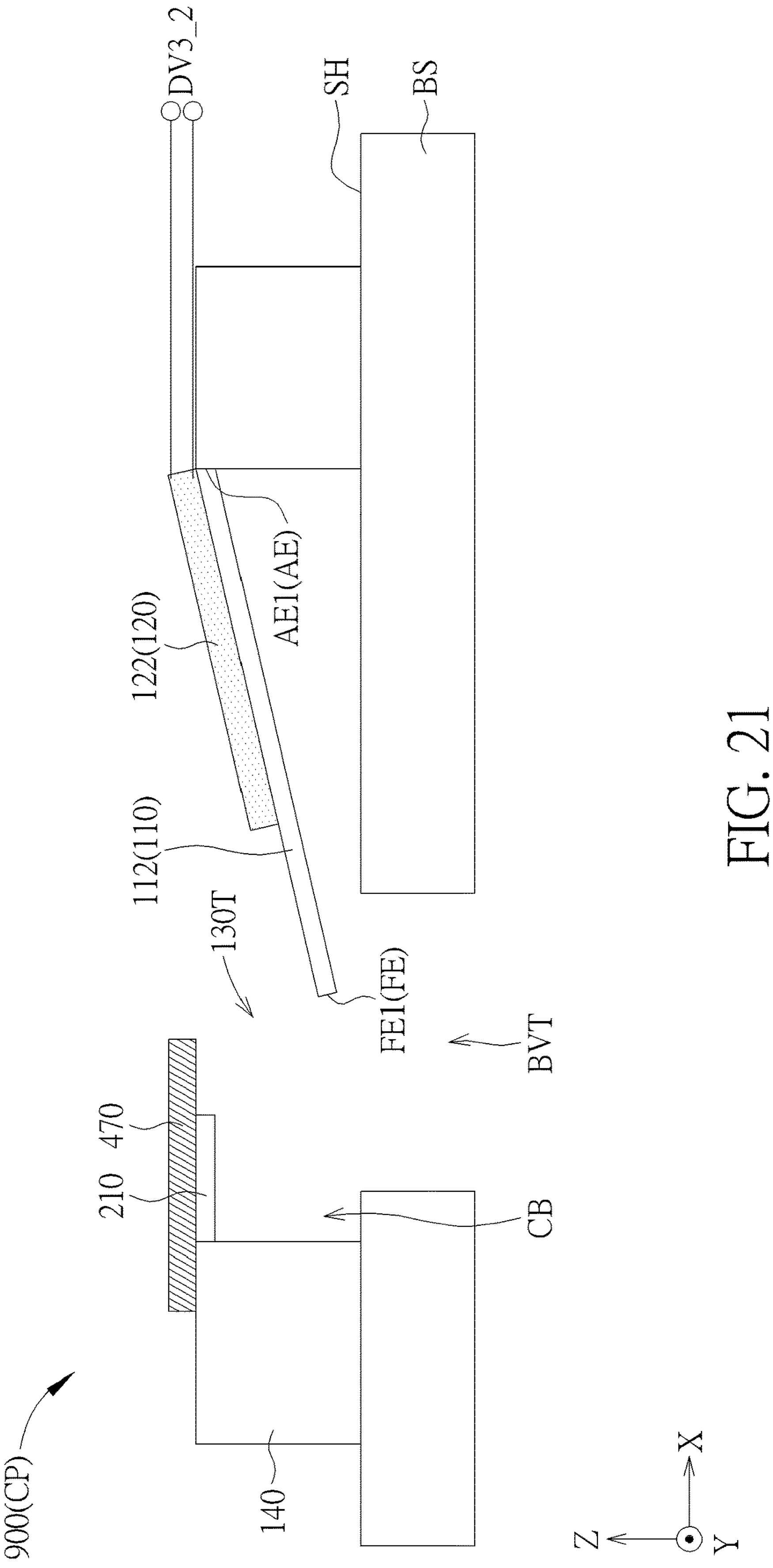
FIG. 21 to FIG. 23 are schematic diagrams of cross sectional views illustrating the film structure of the venting device in different mode according to a ninth embodiment of the present invention.
Figure 22:
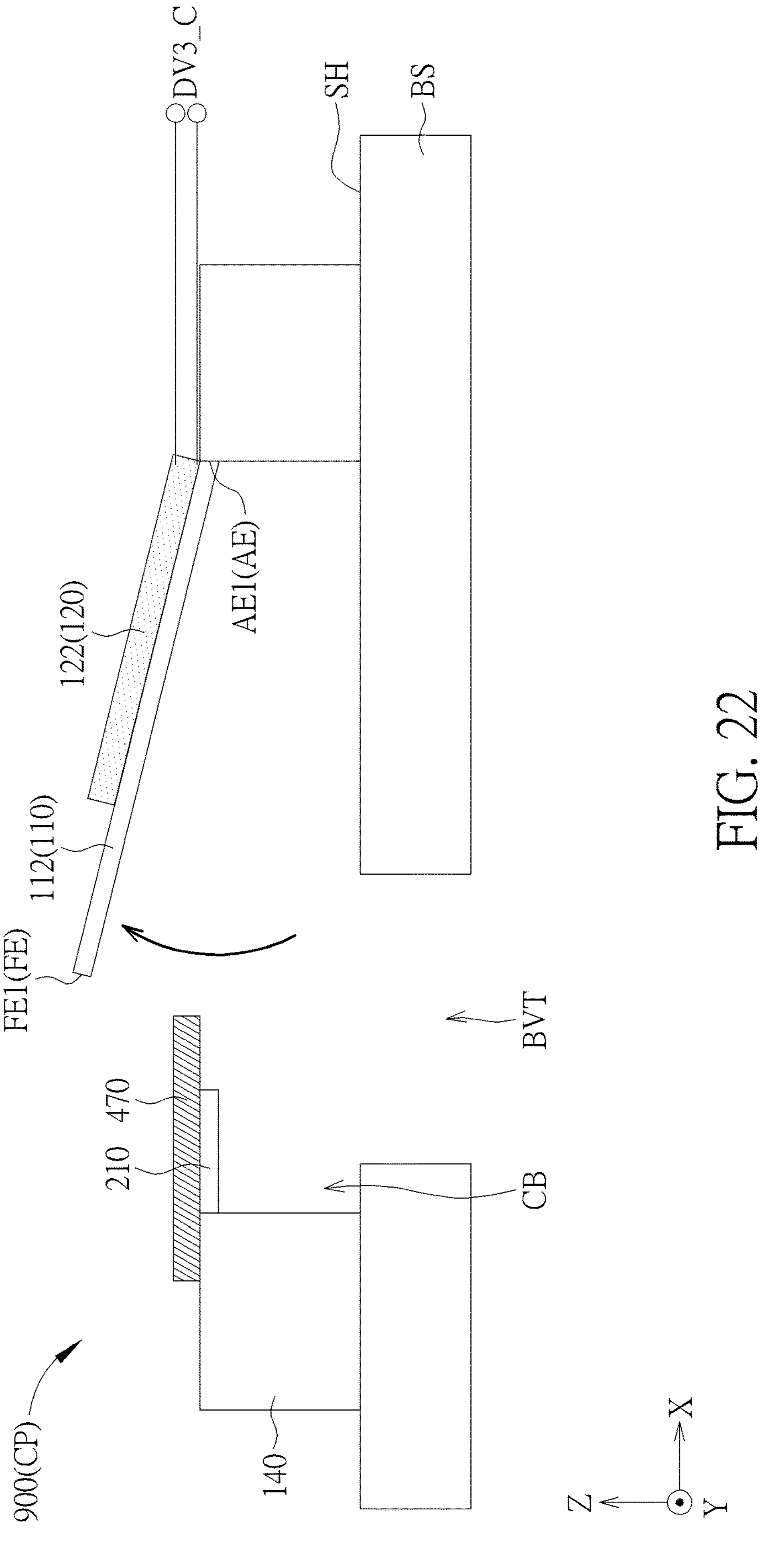
Figure 23:
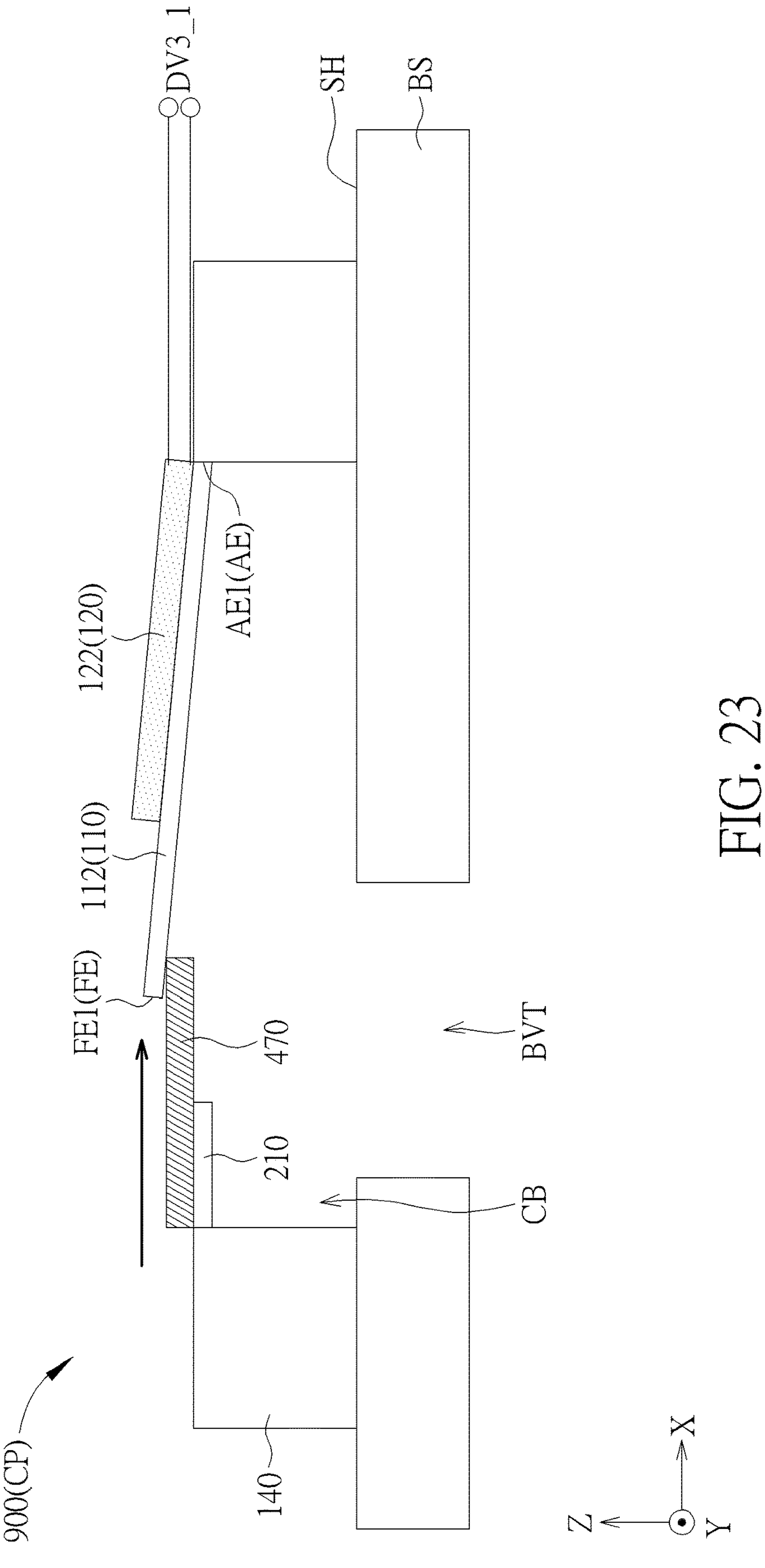

Referring to FIG. 21 to FIG. 23, FIG. 21 to FIG. 23 are schematic diagrams of cross sectional views illustrating the film structure 110 of the venting device in different mode according to a ninth embodiment of the present invention, wherein FIG. 21 shows the second mode of the venting device 900, FIG. 23 shows the first mode of the venting device 900, and FIG. 22 shows the transition between the first mode and the second mode. Compared with the venting device 700 shown in FIG. 18 to FIG. 19, the venting device 900 shown in FIG. 21 to FIG. 23 further includes a clamp 470 configured to hold the film structure 110 at the first position when the controller 160 determines to close the vent 130T (i.e., the controller 160 determines to make the venting device 900 in the first mode). Thus, as shown in FIG. 23, the clamp 470 may prevent the free end FE of the film structure 110 (the first free end FE1 of the first flap 112) from moving downwards or upwards. The detail design of the clamp 470 can be referred to above, and repeated parts will not be redundantly described.

As shown in FIG. 21 to FIG. 23, the clamp 470 may be disposed laterally by the film structure 110 in the top view perspective, and the clamp 470 may be actuated to move for holding the film structure 110 or release the film structure 110. For example, in FIG. 21 to FIG. 23, the clamp 470 may be disposed on the stationary structure 210 and adjacent to the free end FE of the film structure 110 (i.e., the first free end FE1 of the first flap 112). For example, in FIG. 21 to FIG. 23, the clamp 470 may move horizontally when the clamp 470 is actuated, but not limited thereto. For example, in FIG. 21 to FIG. 23, the clamp 470 may move toward the free end FE of the film structure 110 in the horizontal direction (e.g., the direction X) to hold the film structure 110, and the clamp 470 may move away from the free end FE of the film structure 110 in the horizontal direction (e.g., a direction opposite to the direction X) to release the film structure 110, but not limited thereto. In FIG. 23, when the clamp 470 holds the film structure 110, the clamp 470 prevents the film structure 110 from moving downwards.

In transition from the second mode (FIG. 21) to the first mode (FIG. 23), the free end FE of the film structure 110 (e.g., the first free end FE1 of the first flap 112) may move upwards to be above the first position by applying a mode-changing driving signal DV3_C on the actuator 120 (e.g., the first actuating portion 122), as shown in FIG. 22. Then, as shown in FIG. 23, the clamp 470 may move toward the free end FE of the film structure 110, and the free end FE of the film structure 110 may move downwards to the first position by applying the first mode driving signal (e.g., the driving signal DV3_1) on the actuator 120, such that the clamp 470 may hold the film structure 110 at the first position.

Conversely, in transition from the first mode (FIG. 23) to the second mode (FIG. 21), the free end FE of the film structure 110 (e.g., the first free end FE1 of the first flap 112) may move upwards to be above the first position by applying the mode-changing driving signal DV3_C on the actuator 120 (e.g., the first actuating portion 122). Then, the clamp 470 may move away from the free end FE of the film structure 110, and the free end FE of the film structure 110 may hang downwards to be below the first position and the flat position by applying the second mode driving signal (e.g., the driving signal DV3_2) on the actuator 120.

For instance, since the clamp 470 holds the film structure 110 at the first position, the first mode driving signal (e.g., the driving signal DV3_1) may be 0V or ground voltage, or the actuator 120 is floating in the first mode, so as to decrease the power consumption of the venting device 900 in the first mode (e.g., the power consumed by the venting device 900 in the first mode may be 0.3 μW), but not limited thereto. Namely, after the clamp 470 holds the film structure 110 at the first position, no voltage is applied to the actuator 120, and the vent 130T is closed (the venting device 900 is in the first mode).

In this case, the first mode driving signal (e.g., the driving signal DV3_1) and the second mode driving signal (e.g., the driving signal DV3_2) may be 0V or ground voltage, or the actuator 120 is floating in the first mode and the second mode, so as to decrease the power consumption of the venting device 900.

Moreover, in some embodiments, after the clamp 470 holds the film structure 110 at the first position, no voltage is applied to the clamp 470 and the vent 130T is closed, so as to decrease the power consumption of the venting device 900. In some embodiments, after the clamp 470 releases the film structure 110, no voltage is applied to the clamp 470, so as to decrease the power consumption of the venting device 900.

Figure 24:
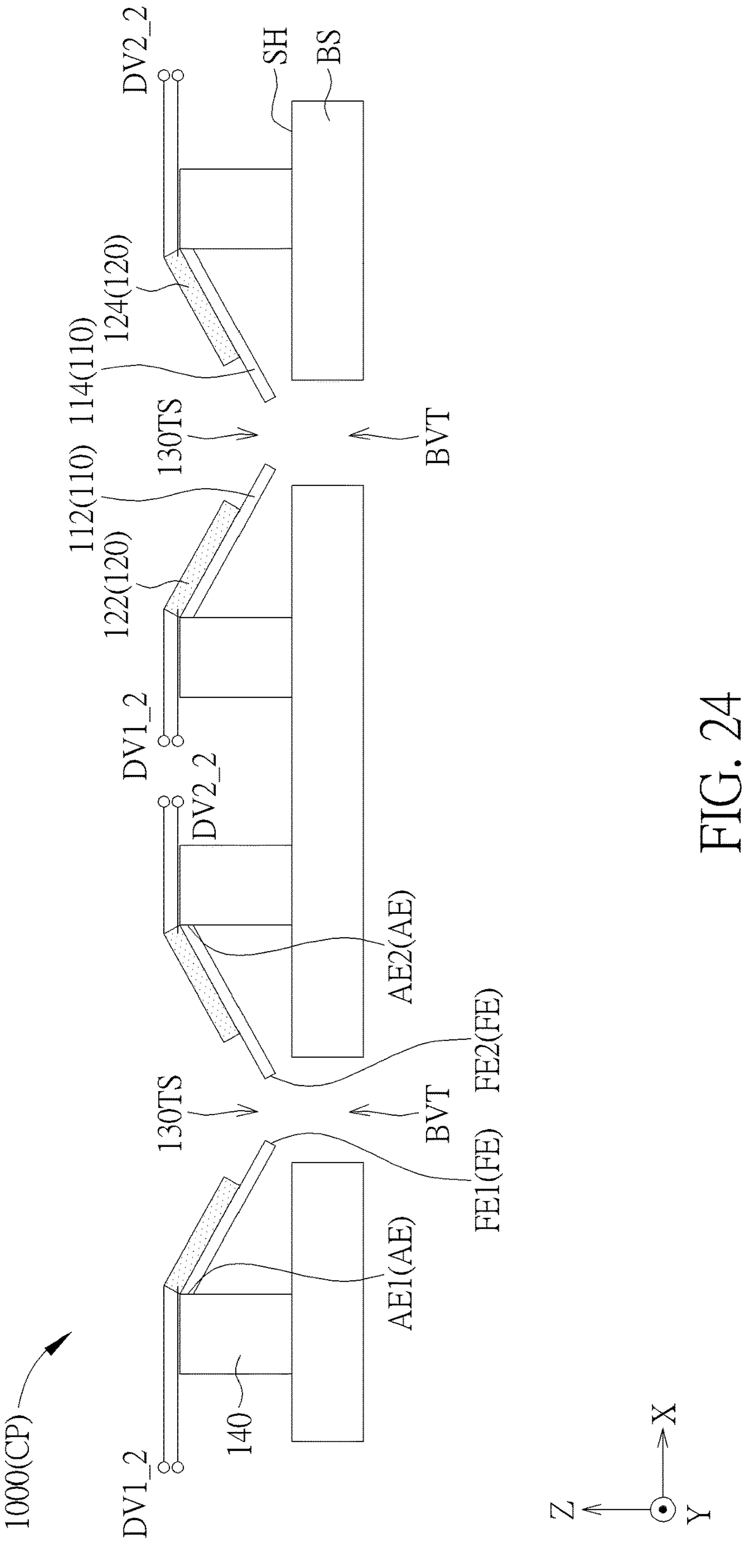
FIG. 24 is a schematic diagram of a cross sectional view illustrating the film structure of the venting device according to a tenth embodiment of the present invention.

Referring to FIG. 24, FIG. 24 is a schematic diagram of a cross sectional view illustrating the film structure of the venting device according to a tenth embodiment of the present invention, wherein FIG. 21 shows the second mode of the venting device 1000. Compared with the venting device 100 shown in FIG. 1 to FIG. 5, the venting device 1000 shown in FIG. 24 has a plurality of film structures 110 anchored by the same anchor structure 140 or different anchor structures 140. In the first mode, the film structures 110 may move to and be maintained as the first position. In the second mode, the film structures 110 may bend downwards and be below the first position and the flat position. Note that the film structures 110 may be integrated in the same chip CP or belong to different chips CP (e.g., in FIG. 24 the film structures 110 belong to different chips CP).

In the second mode shown in FIG. 24, a plurality of small vents 130TS may be formed by the film structures 110. The width of the small vent 130TS formed between two opposite sidewalls of the slit 130 in the second mode is greater than the width of the gap 130P existing between two opposite sidewalls of the slit 130 in the first mode. Since the venting device 1000 has a plurality of film structures 110 to form a plurality of small vents 130TS, the effect of the plurality of small vents 130TS shown in FIG. 24 is equivalent to the effect of one vent 130T of other embodiment. Therefore, the occlusion effect would be suppressed by the venting device 1000 in the second mode shown in FIG. 24.

Moreover, since the film structures 110 may bend downwards, the driving signal DV1_2 and the driving signal DV2_2 may be 0V or ground voltage, or the first actuating portion 122 and the second actuating portion 124 may be floating, but not limited thereto. Thus, the power consumption of the venting device 1000 in the second mode is reduced.

In summary, because of the existence of the slit, the venting device may form the vent for suppressing the occlusion effect or close the vent for making acoustic transducer perform the acoustic transformation with high performance. That is to say, the slit serves as the dynamic front vent of the venting device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A venting device, disposed within a wearable sound device or to be disposed within the wearable sound device, the venting device comprising:
an anchor structure;
a film structure, comprising an anchor end anchored on the anchor structure and a free end, configured to form a vent or close the vent; and
an actuator, disposed on the film structure, configured to be driven to cause a movement of the film structure;
wherein the film structure partitions a space into a first volume and a second volume, and the first volume and the second volume are connected via the vent when the vent is formed;
wherein the venting device is controlled by a controller to seal the vent via controlling the actuator disposed on the film structure of the venting device when the controller determines to close the vent;
wherein the venting device is configured to form the vent;
wherein the controller determines to form the vent and the vent is formed via applying no voltage on the actuator.

2. The venting device of claim 1,
wherein when the controller determines to close the vent, the film structure is actuated according to a voltage generated by the controller and maintained as a first position;
wherein the first position is parallel to a base on which the venting device is disposed.

3. The venting device of claim 1, further comprising:
a clamp, configured to hold the film structure at a first position when the controller determines to close the vent.

4. The venting device of claim 3, wherein after the clamp holds the film structure at the first position, no voltage is applied to the actuator and the vent is closed.

5. The venting device of claim 3, wherein the clamp prevents the free end of the film structure from moving downwards or upwards.

6. The venting device of claim 3, wherein the clamp is disposed laterally by the film structure in a top view perspective.

7. The venting device of claim 3, wherein the clamp moves horizontally when the clamp is actuated.

8. The venting device of claim 3, wherein after the clamp holds the film structure at the first position, no voltage is applied to the clamp and the vent is closed.

9. The venting device of claim 1,
wherein when the controller does not determine to close the vent, the film structure bends downwards and is below a flat position, such that the vent is formed;
wherein the flat position is parallel to a base on which the venting device is disposed.

10. The venting device of claim 1,
wherein when the controller does not determine to close the vent, no voltage is applied on the actuator, such that the film structure hangs downwards and is below a flat position, and the vent is formed;

wherein the flat position is parallel to a base on which the venting device is disposed.

11. The venting device of claim 1, wherein the film structure comprises a first flap and a second flap;

wherein the actuator comprises a first actuating portion disposed on the first flap and a second actuating portion disposed on the second flap.

12. The venting device of claim 11, wherein when the controller determines to close the vent, the first flap and the second flap are actuated and maintained as a first position to close the vent.

13. The venting device of claim 11, comprising:

a stationary structure, disposed between the first flap and the second flap;

wherein when the controller does not determine to close the vent, the first flap and the second flap bend downwards and are below a flat position, such that the vent is formed;

wherein the flat position is parallel to a base on which the venting device is disposed.

14. The venting device of claim 13, wherein the stationary structure is parallel to the base.

15. The venting device of claim 11, wherein when the controller does not determine to close the vent, no voltage is applied on the first actuating portion.

16. The venting device of claim 1, wherein a slit is formed on the film structure to form a clamp structure;

wherein the clamp structure formed on the film structure is configured to constrain a deformation of the film structure when the controller determines to form the vent.

17. The venting device of claim 16, wherein the clamp structure has two clamp components, and the clamp components are buckled to each other when the clamp structure constrains the deformation of the film structure.

18. The venting device of claim 1, comprising:

a stationary structure, disposed on a base and adjacent to the film structure; and a clamp, disposed on the stationary structure.

19. The venting device of claim 1, wherein the wearable sound device comprises the controller and an acoustic transducer configured to perform an acoustic transformation.

* * * * *